US008107119B2

(12) United States Patent
Ushio

(10) Patent No.: US 8,107,119 B2
(45) Date of Patent: Jan. 31, 2012

(54) IMAGE FORMING APPARATUS AND IMAGE FORMING SYSTEM

(75) Inventor: Masaru Ushio, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 988 days.

(21) Appl. No.: 12/050,562

(22) Filed: Mar. 18, 2008

(65) Prior Publication Data

US 2008/0266597 A1 Oct. 30, 2008

(30) Foreign Application Priority Data

Apr. 27, 2007 (JP) ................................ 2007-118596

(51) Int. Cl.

*G06F 15/00* (2006.01)
*G06K 1/00* (2006.01)
*G06F 3/12* (2006.01)

(52) U.S. Cl. ..................................... 358/1.18; 358/1.13

(58) Field of Classification Search ........................ None
See application file for complete search history.

(56) References Cited

U.S. PATENT DOCUMENTS 7,649,643 B2 * 1/2010 Salgado ....................... 358/1.15
8,009,322 B2 * 8/2011 Sato ............................. 358/1.18

FOREIGN PATENT DOCUMENTS

JP 4-142993 5/1992
JP 2004-287411 10/2004

* cited by examiner

*Primary Examiner* — Douglas Tran

(74) *Attorney, Agent, or Firm* — Finnegan, Henderson, Farabow, Garrett & Dunner, L.L.P.

(57) ABSTRACT

Disclosed an image forming apparatus including: an image forming section to form images on sheets based on image data of a document composed of a plurality of document pages; a sheet finishing section to perform sheet finishing to the sheets; a first input section to receive an input regarding divisions of the document pages by the sheet finishing to set the input divisions; a second input section to receive setting of addition of a front cover; and a control section to allow the image forming section to form an image on a first sheet of each of the divisions as the front cover when the first input section sets the divisions of the document pages by the sheet finishing and the second input section sets the addition of the front cover.

8 Claims, 16 Drawing Sheets

START
S11 STAPLE + FRONT COVER? — NO → S12 OTHER PROCESSING
YES
S13 DIVISION PAGE COUNTER D8 = 1? — NO → S16
YES(FIRST PAGE)
S14 SET PAPER FEED TRAY TO FRONT COVER TRAY
S15 SET: STAPLE EXISTS; NO DIVISIONS EXIST
S16 SET PAPER FEED TRAY TO BODY TEXT TRAY
S17 SET STAPLE AND DIVISION INFORMATION OF PAGE DATA INDICATED BY PRINT PAGE NUMBER
S18 SET FIRST PAPER FEED PREPARATION SIGNAL
END

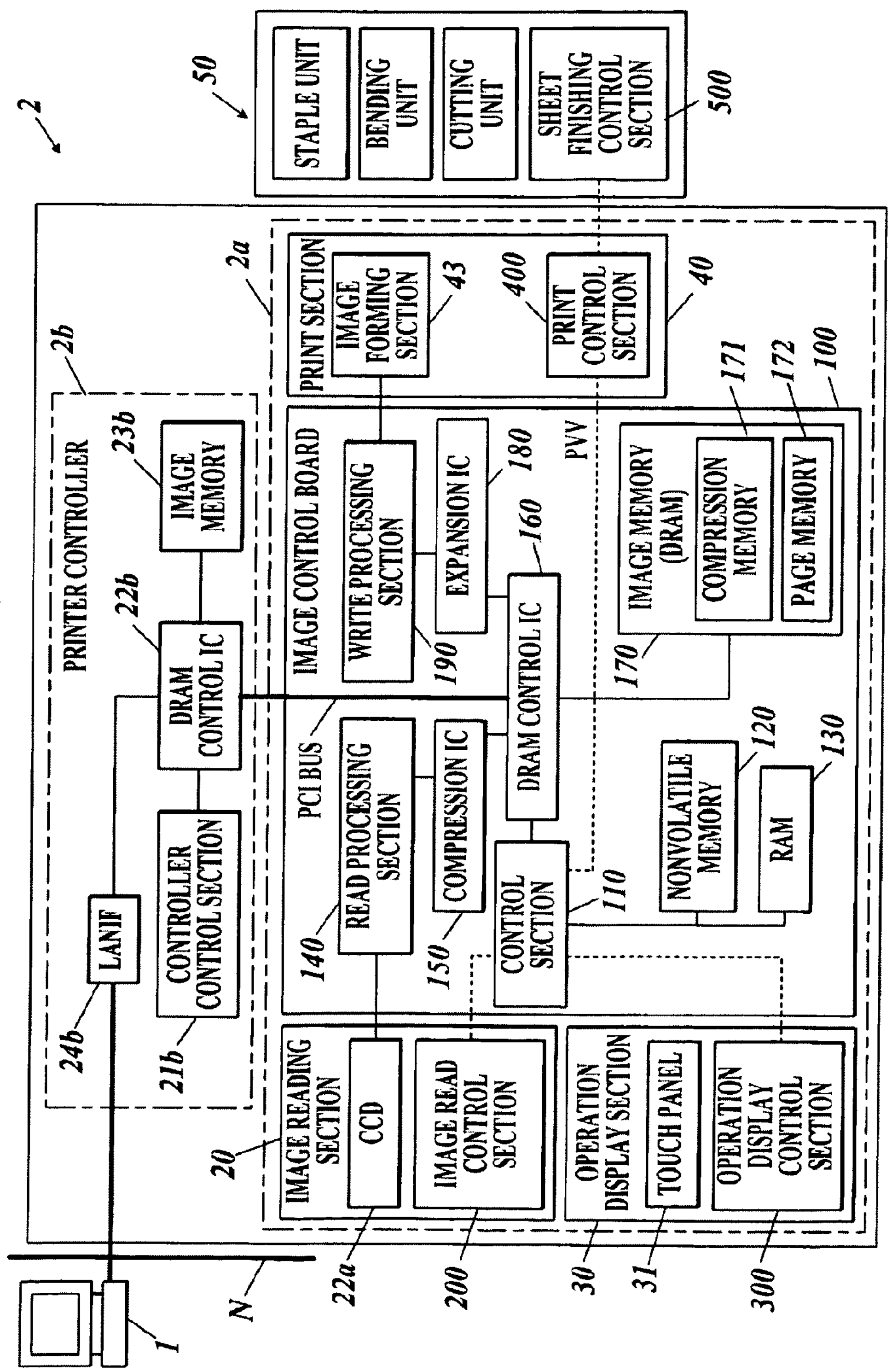
FIG.6
2
50
STAPLE UNIT
BENDING UNIT
CUTTING UNIT
SHEET FINISHING CONTROL SECTION
500
2a
PRINT SECTION
IMAGE FORMING SECTION
43
400
PRINT CONTROL SECTION
40
2b
PRINTER CONTROLLER
23b
IMAGE MEMORY
22b
DRAM CONTROL IC
IMAGE CONTROL BOARD
WRITE PROCESSING SECTION
EXPANSION IC
180
160
PVV
171
172
100
IMAGE MEMORY (DRAM)
COMPRESSION MEMORY
PAGE MEMORY
190
170
DRAM CONTROL IC
PCI BUS
READ PROCESSING SECTION
COMPRESSION IC
120
130
NONVOLATILE MEMORY
RAM
LANIF
CONTROLLER CONTROL SECTION
CONTROL SECTION
110
140
150
24b
21b
IMAGE READING SECTION
CCD
IMAGE READ CONTROL SECTION
OPERATION DISPLAY SECTION
TOUCH PANEL
OPERATION DISPLAY CONTROL SECTION
20
N
1
22a
200
30
31
300

| JOB DATA | | | | |
|---|---|---|---|---|
| 131a | PAGE COMMON DATA | SET NUMBER OF COPIES | 1 | D1 |
| | | OUTPUT NUMBER OF COPIES | 0 | D2 |
| | | COPY MODE | ONE SIDE→BOTH SIDES | D3 |
| | | SHEET FINISHING MODE | ONE PLACE STAPLING | D4 |
| | | BODY TEXT TRAY | TRAY2 | D5 |
| | | FRONT COVER | PRINT | D6 |
| | | FRONT COVER TRAY | TRAY1 | D6a |
| | | FIRST PAMPHLET ONLY | 1 | D6b |
| | | PRINT PAGE NUMBER | 1 | D7 |
| | | DIVISION PAGE COUNTER | 1 | D8 |
| | | NUMBER OF READ IMAGES n | 16 | D9 |
| 131b | PAGE DATA PAGE1 | IMAGE STORING ADDRESS | 01**** | D11 |
| | | STAPLE | EXIST | D12 |
| | | DIVISION | NOT EXIST | D13 |
| | PAGE2 | IMAGE STORING ADDRESS | 02**** | |
| | | STAPLE | EXIST | |
| | | DIVISION | EXIST | |
| | ⋮ | ⋮ | ⋮ | |
| | PAGEm | IMAGE STORING ADDRESS | 0m**** | |
| | | STAPLE | EXIST | |
| | | DIVISION | EXIST | |

FIG.12A
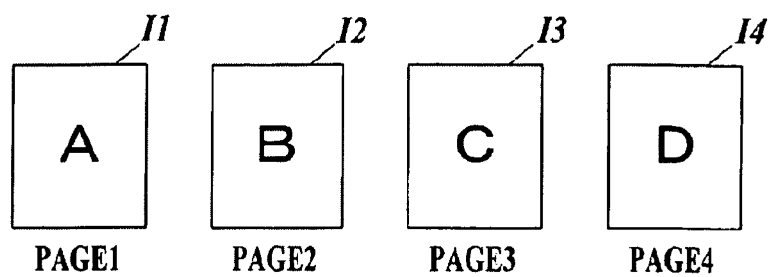
FIG.12B
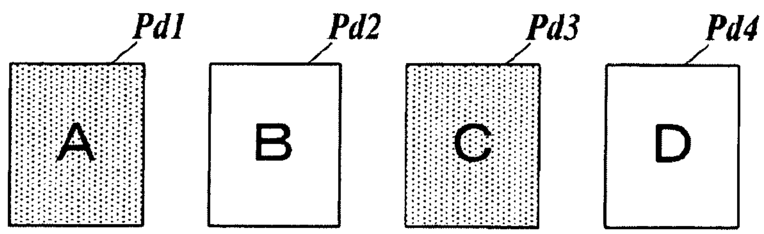
FIG.12C
A
C

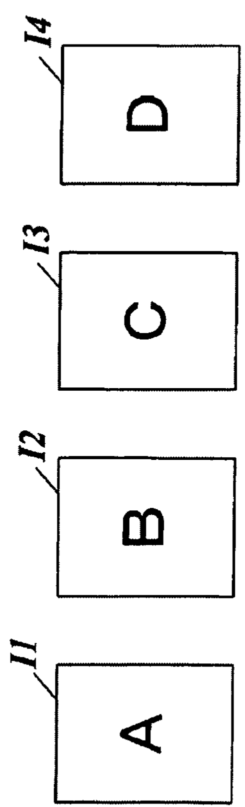
FIG.14A
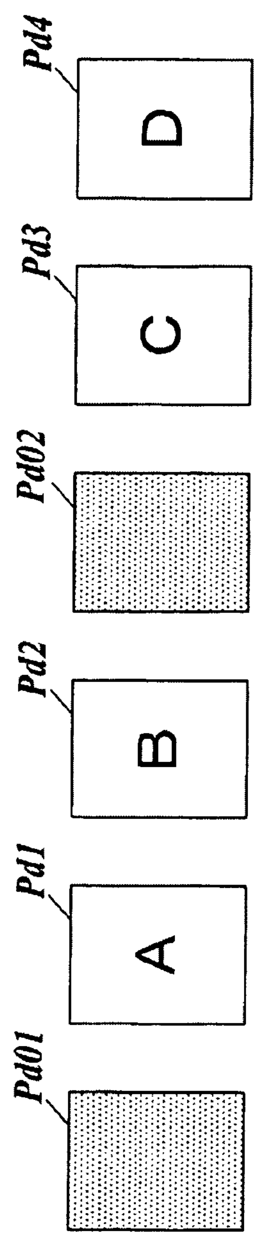
FIG.14B
FIG.14C

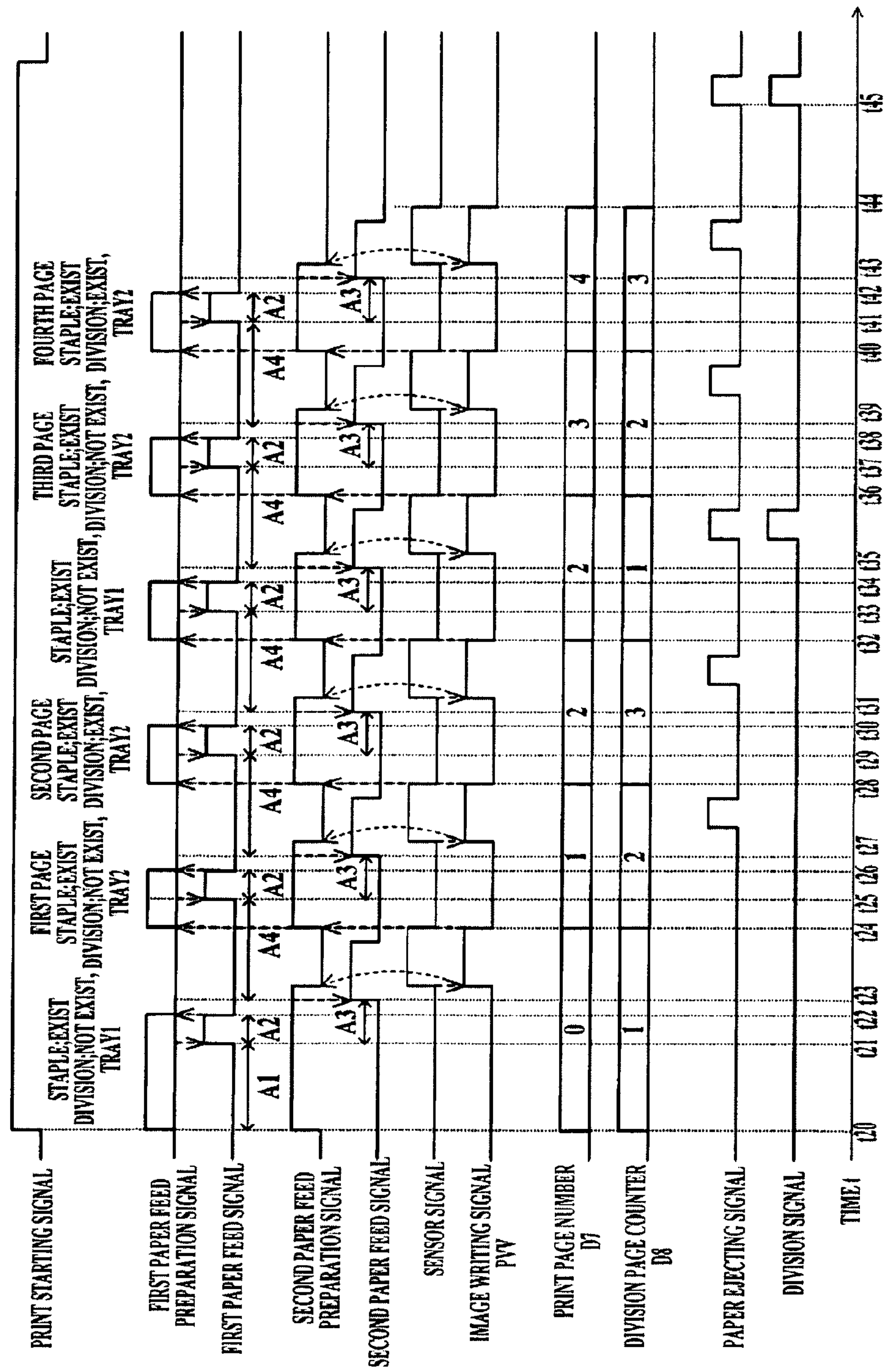
FIG. 15
PRINT STARTING SIGNAL
FIRST PAPER FEED PREPARATION SIGNAL
FIRST PAPER FEED SIGNAL
SECOND PAPER FEED PREPARATION SIGNAL
SECOND PAPER FEED SIGNAL
SENSOR SIGNAL
IMAGE WRITING SIGNAL PVV
PRINT PAGE NUMBER D7
DIVISION PAGE COUNTER D8
PAPER EJECTING SIGNAL
DIVISION SIGNAL
TIME t
STAPLE;EXIST DIVISION;NOT EXIST TRAY1
FIRST PAGE STAPLE;EXIST DIVISION;NOT EXIST, TRAY2
SECOND PAGE STAPLE;EXIST DIVISION;EXIST, TRAY2
STAPLE;EXIST DIVISION;NOT EXIST TRAY1
THIRD PAGE STAPLE;EXIST DIVISION;NOT EXIST, TRAY2
FOURTH PAGE STAPLE;EXIST DIVISION;EXIST, TRAY2
A1 A2 A3 A4
t20 t21 t22 t23 t24 t25 t26 t27 t28 t29 t30 t31 t32 t33 t34 t35 t36 t37 t38 t39 t40 t41 t42 t43 t44 t45

IMAGE FORMING APPARATUS AND IMAGE FORMING SYSTEM

BACKGROUND

1. Field of the Invention

The present invention relates to an image forming apparatus and an image forming system.

2. Description of Related Art

In recent years has been provided an image forming apparatus that is composed of an image forming section to form an image on sheets, and a sheet finishing section to perform sheet finishing, such as punching processing, stapling processing, and bending processing, to the paper on which the image is formed by the image forming section.

For example, Japanese Patent Application Laid-Open Publication No. Hei 4-142993 discloses a copying machine provided with a page inputting section to specify an arbitrary page and a control section to perform the control of binding the sheets up to a specified page every specified page in order to enable binding processing at every bundle at the time of outputting a plurality of bundles of sheets of paper, as such an image forming apparatus.

Furthermore, an image forming apparatus having the functions of printing page numbers, performing layout processing, and the like, in addition to the sheet finishing, such as the stapling processing and the bending processing, appeared. Among such image forming apparatus, there is an image forming apparatus capable of changing the settings of image forming conditions by the plurality of sheets of paper, by the job, by the plurality of pages, and by the page.

Moreover, Japanese Patent Application Laid-Open Publication No. 2004-287411 discloses an image forming apparatus dividing a plurality of original documents into a plurality of groups to perform image formation of all of the groups in accordance with the image forming conditions that are set by the group, and an image forming apparatus setting at least one of a layout, information addition, and sheet finishing to predetermined pages of the whole documents composed of a plurality of pages as a second image forming condition different from first image forming conditions pertaining to the whole documents to perform image formation of the predetermined pages in accordance with the second image forming condition.

However, in such a conventional image forming apparatus, if the function of adding front covers or of forming only the image of the first document page on the sheets which is different from that of the other document pages (front cover setting) is set for documents composed of a plurality of document groups, each group including a plurality of document pages, then the front cover setting is performed only to the first document page of the first document group. In order to perform the front cover setting to the first document pages of all of the document groups, a user has to perform the front cover setting every document page or every document group, and that is a troublesome operation for the user and the usability of the conventional image forming apparatus is not good.

SUMMARY

An image forming apparatus reflecting an aspect of the present invention includes: an image forming section to form images on sheets based on image data of a document composed of a plurality of document pages; a sheet finishing section to perform sheet finishing to the sheets; a first input section to receive an input regarding divisions of the document pages by the sheet finishing to set the input divisions; a second input section to receive setting of addition of a front cover; and a control section to allow the image forming section to form an image on a first sheet of each of the divisions as the front cover when the first input section sets the divisions of the document pages by the sheet finishing and the second input section sets the addition of the front cover.

An image forming system reflecting an aspect of the present invention includes: an operation apparatus to transmit image data of a document composed of a plurality of document pages and an instruction of sheet finishing performed to sheets on which images are formed based on the image data; and an image forming apparatus including an image forming section to form the images on the sheets based on the image data received from the operation apparatus, and a sheet finishing apparatus to perform the sheet finishing to the sheets, the image forming apparatus connected to the operation apparatus in a state capable of mutual communications, wherein: the operation apparatus includes: a first input section to receive an input regarding divisions of the document pages by the sheet finishing; and a second input section to perform a setting of addition of a front cover, and the image forming apparatus includes a control section to allow the image forming section to form the images with a first sheet of each of the divisions used as the front cover when the divisions of the document pages by the sheet finishing are set with the first input section and the setting of the addition of the front cover is performed with the second input section.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein:

FIG. 6 is a control block diagram of the image forming apparatus;

FIG. 7 is a diagram showing an example of job data;

FIG. 12A is a view showing image data composed of a plurality of individual pieces of image data corresponding to a plurality of document pages produced with application software in the operation apparatus;

FIG. 12B is a view showing print data composed of a plurality of pieces of print page data to be formed on sheets in the image forming apparatus;

FIG. 12C is a view sowing images of bundles of sheets of paper after sheet finishing to be ejected from the image forming apparatus;

FIG. 14A is a view showing image data composed of a plurality of individual pieces of image data corresponding to a plurality of document pages produced with the application software in the operation apparatus;

FIG. 14B is a view showing print data composed of a plurality of pieces of print page data to be formed on sheets in the image forming apparatus;

FIG. 14C is a view sowing images of bundles of sheets of paper after sheet finishing to be ejected from the image forming apparatus; and FIG. 15 is a diagram showing an example of a time chart of the operations of the image forming apparatus realizing the print processing of FIGS. 14A-14C.

DETAILED DESCRIPTION OF THE PREFERRED EMBODIMENT

In the following, the preferred embodiments of the present invention will be described with reference to the attached drawings.

The configuration thereof is first described.

Figure 1:
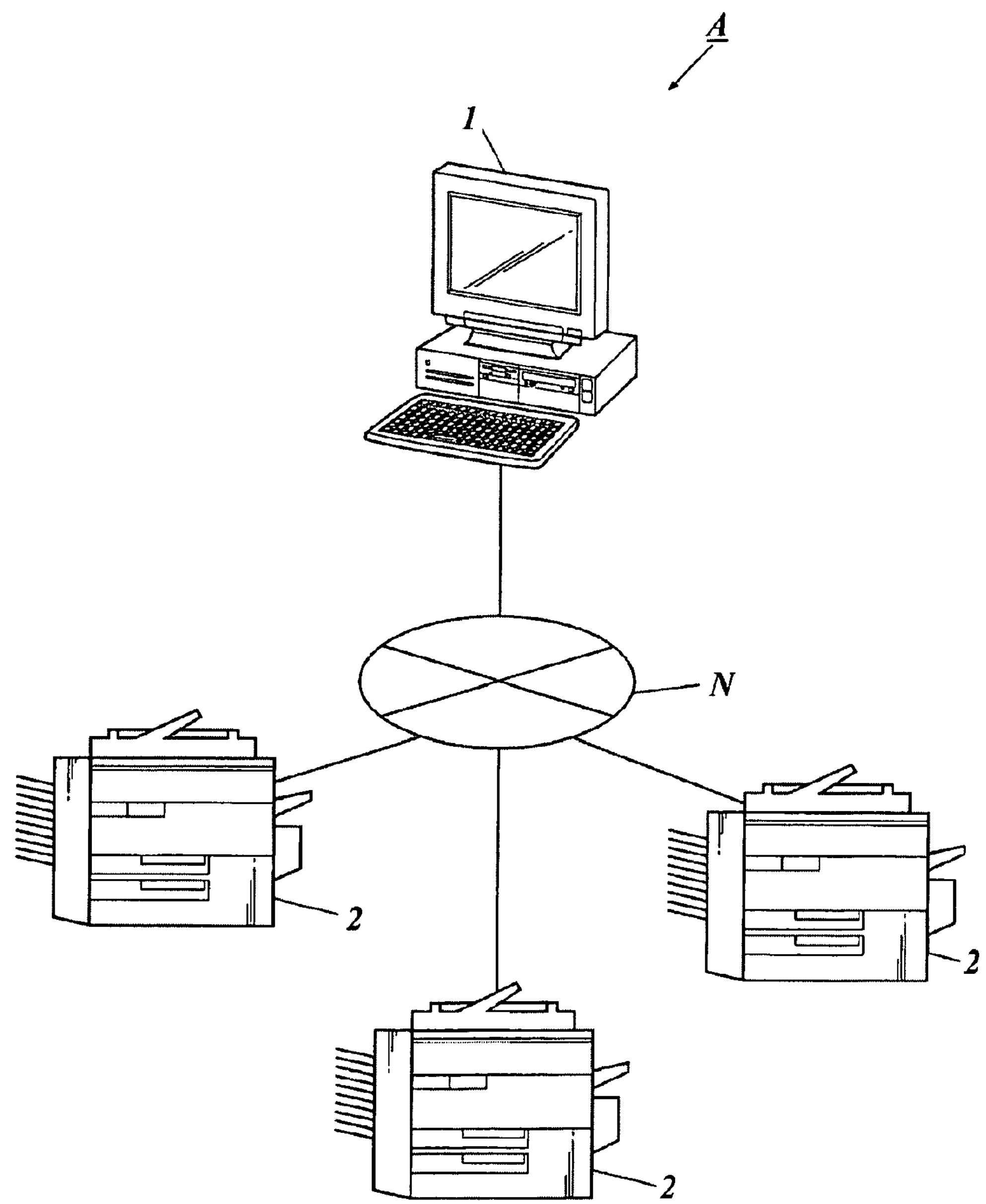
FIG. 1 is a view showing the configuration of an image forming system of the present embodiment.

FIG. 1 shows the configuration of an image forming system A of the present embodiment.

As shown in FIG. 1, the image forming system A includes an operation apparatus 1 and image forming apparatus 2, and each apparatus is connected to one another in a state capable of performing communications through a network N. Incidentally, although FIG. 1 shows the example in which one operation apparatus 1 and three image forming apparatus 2 are connected one another, the numbers of the respective apparatus to be provided are not especially limited.

The operation apparatus 1 aims to perform the remote control of the image forming apparatus 2, and, for example, if the operation apparatus 1 controls one of the image forming apparatus 2 to allow the image forming apparatus 2 to execute print processing, then the operation apparatus 1 transmits various setting conditions set at the time of printing and image data to the image forming apparatus 2. As the operation apparatus 1, for example, an information processing apparatus, such as a general purpose personal computer, can be applied.

Each of the image forming apparatus 2 is an apparatus including both of an image forming function of forming an image on sheets and a sheet finishing function of performing punching processing, stapling processing, bending processing, cutting processing, and the like, to the sheets on which images are formed, and the apparatus performing the processing in accordance with a setting instruction from an operation display section provided on the apparatus main body or various setting instructions transmitted from the operation apparatus 1.

The network N may be configured as a local area network (LAN) or a wide area network (WAN), or may be the configuration including a telephone network, Integrated Services Digital Network (ISDN), a wide area communication network, a common carrier leased line, a mobile communication network, a communication satellite circuit, a community antenna television (CATV) circuit, an optical communication circuit, a wireless communication circuit, and the like, and an Internet service provider mutually connecting the above media, and the like.

The operation apparatus 1 is first described.

Figure 2:
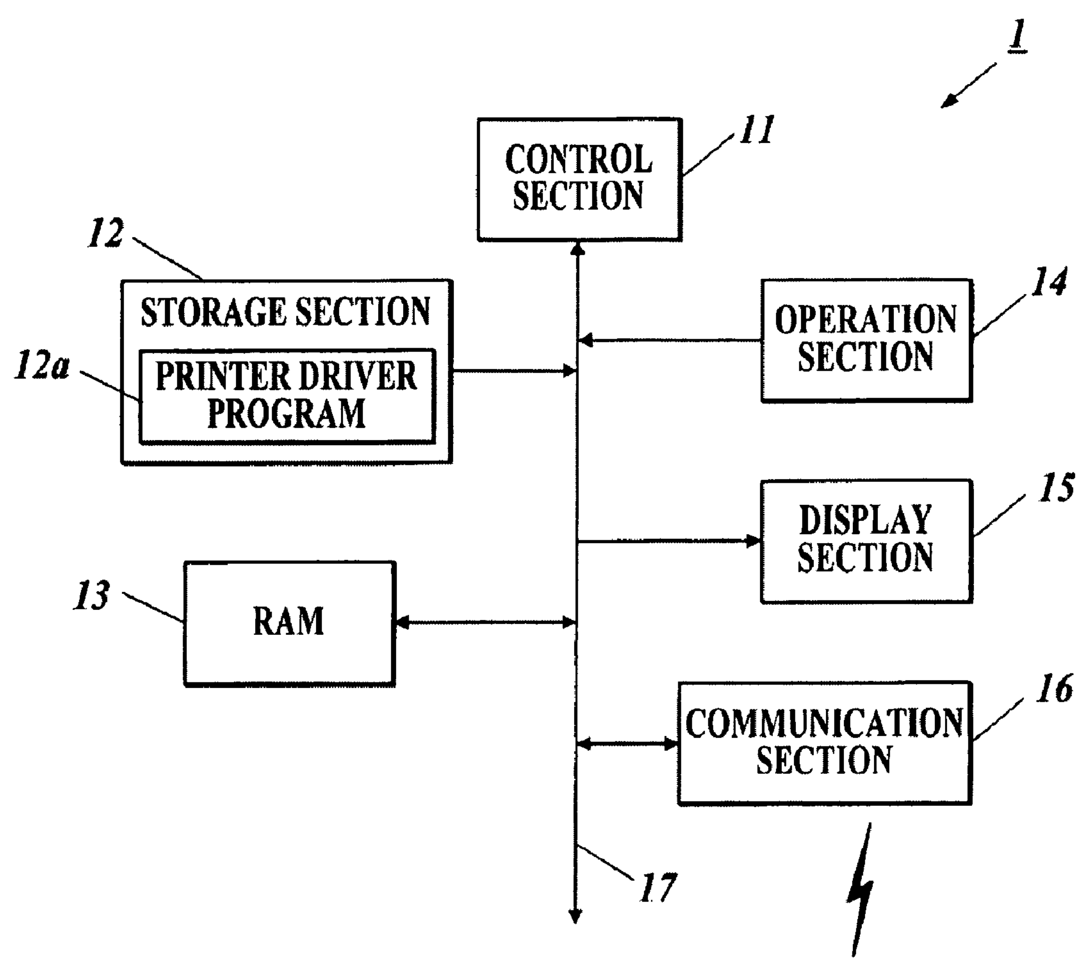
FIG. 2 is an internal configuration diagram of an operation apparatus.

FIG. 2 shows the internal configuration diagram of the operation apparatus 1.

As shown in FIG. 2, the operation apparatus 1 includes a control section 11, a storage section 12, a random access memory (RAM) 13, an operation section 14, a display section 15, a communication section 16, and the like, and each section is connected with one another through a bus 17 or the like in the state capable of performing mutual communications.

The control section 11 includes a central processing unit (CPU) and the like, and expands a system program, various control programs, various data, and the like, stored in the storage section 12 into the RAM 13 to collectively control the whole operation of the operation apparatus 1 in cooperation with these programs and data. Moreover, the control section 11 executes various kinds of processing in accordance with the programs expanded in the RAM 13, and stores the processing results in the RAM 13 and allows the display section 15 to display the processing results. The control section 11 allows the storage section 12 to save the processing results stored in the RAM 13 at a predetermined save destination of the storage section 12.

Moreover, the control section 11 executes print control processing and the like in cooperation with an application software program, a printer driver program 12*a* for executing a printer driver, and various data, each stored in the storage section 12, and the control section 11 stores the processing results into the RAM 13 and displays the processing results on the display section 15.

The storage section 12 is equipped with a nonvolatile storage medium, such as a read only memory (ROM) and a hard disk drive (HDD), and stores the system program, the various control programs, various application programs, the printer driver program 12*a*, each executed by the control section 11, the data pertaining to the programs, and the like, in the storage medium.

The RAM 13 forms a work area to temporarily store the various programs executed by the control section 11 and the data pertaining to the programs.

The operation section 14 includes a keyboard, composed of numeric keys, character keys, cursor move keys, various function keys, and the like, and a pointing device, such as a mouse, for inputting an instruction of the operation in the operation apparatus 1 and an instruction to the image forming apparatus 2. The operation section 14 outputs a depressed signal generated by the keyboard and an operation signal generated by the mouse to the control section 11 as input signals.

The display section 15 is composed of a liquid crystal display (LCD) or the like, and performs the display of various setting screens on the display screen thereof in accordance with a display signal input from the control section 11.

The communication section 16 is composed of various interfaces, such as a network interface card (NIC), a modulator-demodulator (MODEM), and a universal serial bus (USB), and performs mutual transmission and reception of information with external equipment on the network N.

Figure 3:
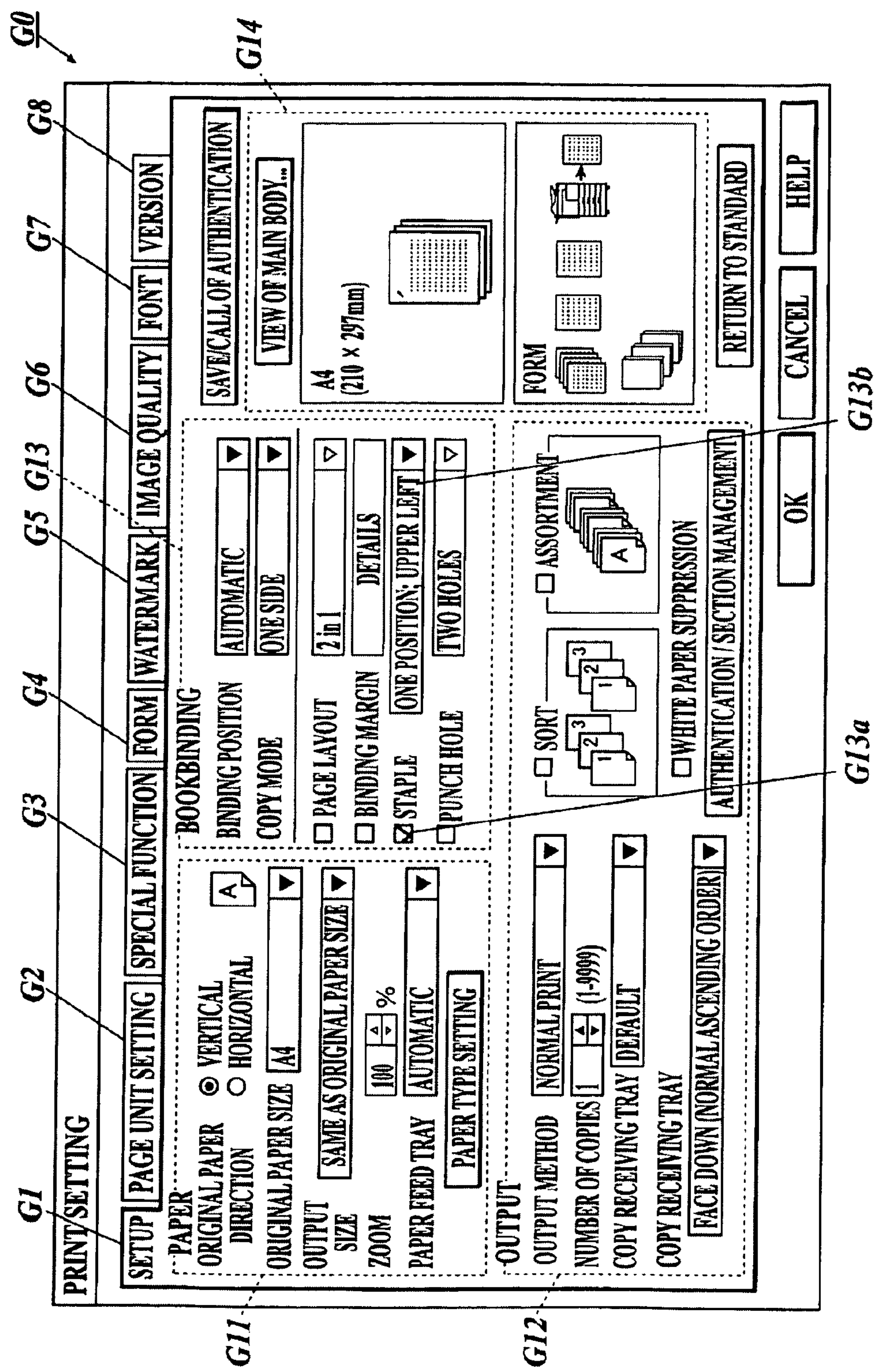
FIG. 3 is a view showing an example of a setup screen.
Figure 4:
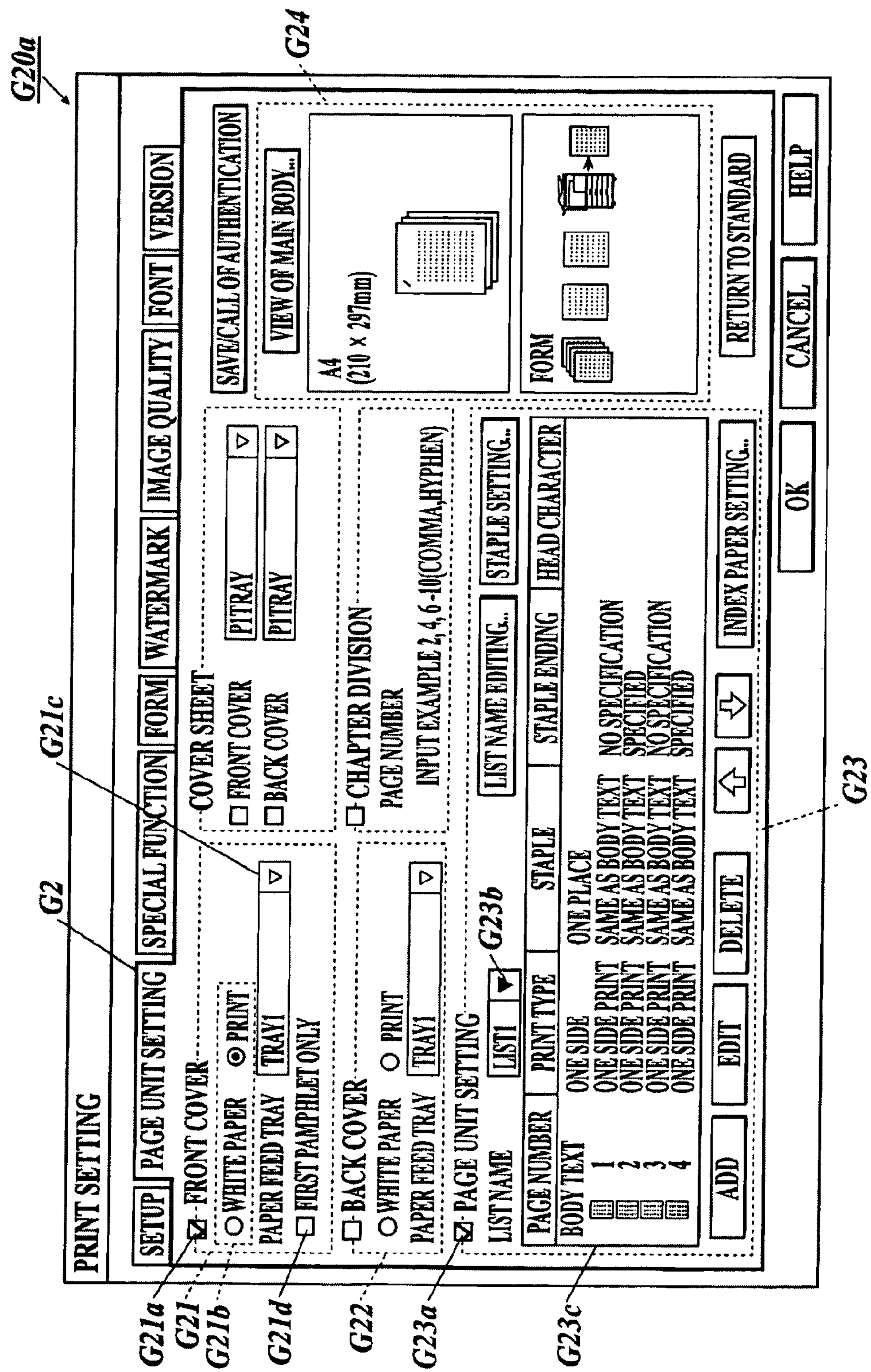
FIG. 4 is a view showing an example of a page unit setting screen.

Examples of various setting screens to be displayed on the display screen of the display section 15 are shown in FIGS. 3 and 4. The various setting screens are screens for inputting various setting conditions in print processing to set them at the time of allowing the image forming apparatus 2 to execute the print processing.

FIG. 3 shows an example of a setup screen G0, and FIG. 4 shows an example of a page unit setting screen G20*a*.

The setup screen G0 shown in FIG. 3 includes: a setup index G1 including a paper setting area G11, an output setting area G12, a bookbinding setting area G13, and a preview area G14; a page unit setting index G2 changing a displayed index to a page unit setting screen; a special screen index G3 changing a displayed index to a special function setting screen; a form index G4 changing a displayed index to a form setting screen; a watermark index G5 changing a displayed index to a watermark setting screen; an image quality index G6 changing a displayed index to an image quality setting screen; a font index G7 changing a displayed index to a font setting screen, a version index G8 changing a displayed index to a version confirming screen to display a revised version of a printer driver, and the like.

The bookbinding setting area G13 includes: a binding position setting button for setting a binding position; a copy mode setting button for setting a copy mode; a page layout setting section for setting whether to aggregate a plurality of original documents by allocating them in one page or not; a number of aggregating sheets setting button for setting the number of documents to be aggregated when the page layout setting section is checked; a binding margin setting section for setting whether to arbitrarily set a binding margin or not; a binding margin setting button for displaying a screen for setting the detailed information of a binding margin, such as the width of the binding margin and an image position, when the binding margin setting section is checked; a staple setting section G13*a* for setting the existence of a staple; a staple setting button G13*b* for setting the kind of the staple when the staple setting section G13*a* is checked; and the like.

The page unit setting screen G20*a* shown in FIG. 4 displays the page unit setting index G2 including a front cover setting area G21, a back cover setting area G22, a page unit setting area G23, a preview area G24, and the like.

The front cover setting area G21 includes: a front cover setting section G21*a* for performing the setting of whether to set the addition of a front cover or not; a blank/print choosing button G21*b* for performing the choice of whether to form the image of a document page on a front cover or whether to form a blank image on the front cover when the front cover setting section G21*a* is checked; a paper feed tray setting button G21*c* for setting a paper feed tray of a front cover; a first pamphlet setting button G21*d* for performing the setting of whether to add a front cover only to the first division or not when document pages are divided into a plurality of divisions, and the like.

The page unit setting area G23 includes: a page unit setting section G23*a* for setting whether to set various setting conditions every document page unit or not; a condition choosing button G23*b* for setting the various setting conditions that a user desires among a previously set plurality of various setting conditions when the page unit setting section G23*a* is checked; a list area G23*c*, in which various setting conditions are displayed by the document page when the page unit setting section G23*a* is checked, and the like.

The list area G23*c* displays individual conditions, such as identification numbers for identifying document pages, the settings of the types of sheet finishing (the existence of staples and the positions of the staples here), and the settings of whether or not it is the end positions or division positions of the sheet finishing (the end positions of the staple are indicated here), the conditions other than the identification numbers corresponding to the identification numbers, each of the individual conditions capable of being set. In this case, each condition is individually set to each of four document pages. For example, the conditions to the document pages of the identification numbers 1 and 3 are set as follows: the staple is provided at one position, and the end position of the staple is not specified. The conditions to the document pages of the identification numbers 2 and 4 are set as follows: the staple is provided at one position, and the end position of the staple is specified. Consequently, the set sheet finishing results in two bundles: a bundle of the document pages identified by the identification numbers 1 and 2, which each include a formed image of the page and are subjected to stapling processing, and a bundle of the document pages identified by the identification numbers 3 and 4, which each include a formed image of the page and are subjected to stapling processing.

Incidentally, the individual conditions are not limited to the types of the sheet finishing and the division positions, but may includes copy modes, paper feed trays, and the like.

The preview area G24 displays the print images of the documents chosen in the list area G23*c*.

In the present invention, a first input section to receive an input regarding the divisions of document pages by the sheet finishing to set the divisions is the page unit setting area G23. A second input section to perform setting the addition of a front cover is the front cover setting section G21*a*. Furthermore, a third input section to receive the choice of whether to form the image of a document page on a front cover or whether to form a blank image on the front cover is the blank/print choosing button G21*b*. A fourth input section to receive the choice of whether to add the front cover only to the first division among a plurality of divisions of document pages or not is the first pamphlet setting button G21*d*.

The image forming apparatus 2 are next described.

Figure 5:
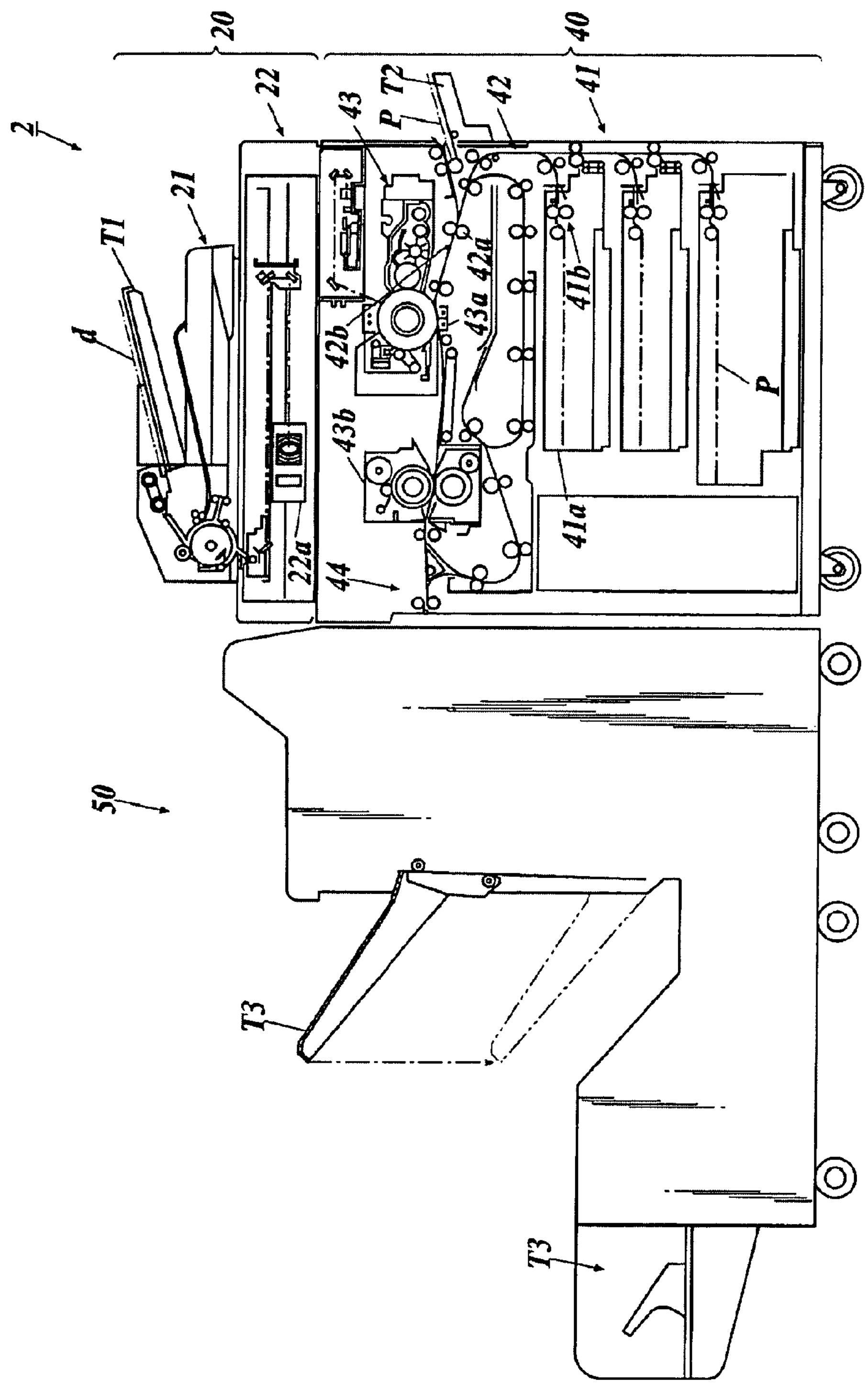
FIG. 5 is a schematic sectional configuration view of an image forming apparatus.

FIG. 5 shows a schematic sectional configuration view of an image forming apparatus 2.

The image forming apparatus 2 is a digital multifunction peripheral equipped with: an image forming section, which reads an image from a document to perform the image formation of the read image on a sheet P, and which image forming section receives image data from the operation apparatus 1 or the like to form an image on the paper P on the basis of the received image data; a sheet finishing section performing punching processing, stapling processing, bending processing, cutting processing, and the like, to sheets, on which images are formed; and the like. As shown in FIG. 5, the image forming apparatus 2 is composed of an image reading section 20, a print section 40, and a sheet finishing section 50.

The image reading section 20 is composed of an automatic document sending section 21, which is called as an auto document feeder (ADF), and a reading section 22. A document d placed on a document tray T1 of the automatic document sending section 21 is conveyed to a contact glass, which is a reading part of the reading section 22, and the image on one side or on both the sides of the document d is read with an optical system of the reading section 22. The image of the document d is then read with a charge coupled device (CCD) 22*a*. The image is not limited to image data, such as a figure and a photograph, but implies that the word includes text data, such as a character and a symbol, and the like, here.

The image (analog image signal) read by the reading section 22 is output to an image control board, which will be described below, and is subjected to A/D conversion in the image control board. Then, after being subjected by various kinds of image processing, the image data is output to the print section 40 as print data.

The print section 40 performs the image formation processing of an electrophotographic printing system on the basis of the input print data, and is composed of a paper feed section 41, a fed paper conveying section 42, an image forming section 43, and a carrying-out section 44.

The paper feed section 41 includes a plurality of paper feed trays 41*a*, paper feed means 41*b*, a manual paper feed tray T2, and the like. Each of the paper feed trays 41*a* houses predetermined sheets P, which are previously classified to each of the paper feed trays 41*a* on the basis of their sizes and their types. The sheets P are conveyed toward the fed paper conveying section 42 one by one from the uppermost sheet by the paper feed means 41*b*. The manual paper feed tray T2 is configured to be able to load various types of paper P according to the need of a user, and conveys the loaded sheets P toward the fed paper conveying section 42 with paper feed rollers one by one from the uppermost sheet.

The fed paper conveying section 42 conveys the paper P conveyed from the paper feed trays 41*a* or the manual paper feed tray T2 to a transferring apparatus 43*a* through a plurality of intermediate rollers, resist rollers 42*a*, and the like.

Moreover, the fed paper conveying section 42 conveys sheets P on which one side image formation has been performed to a both side conveying path with a conveyance path changing plate to convey the paper P to the transferring apparatus 43*a* again through the intermediate rollers, the resist rollers 42*a*, and the like. The image forming section 43 is equipped with: a photosensitive drum; a charging apparatus; an exposure apparatus including a laser output section outputting a laser beam based on image data and a polygon mirror for allowing the laser beam to scan the paper P in the main scanning direction; a development apparatus, the transferring apparatus 43*a*, a cleaning section, and a fixing apparatus 43*b*. To put it concretely, the exposure apparatus radiates a laser beam onto the photosensitive drum charged by the charging apparatus to form an electrostatic latent image. The development apparatus then develops the electrostatic latent image by adhering charged toner to the surface of the photosensitive drum, on which the electrostatic latent image is formed. The toner image formed on the photosensitive drum by the development apparatus is transferred to the paper P in the transferring apparatus 43*a*. Moreover, after the transfer of the toner image onto the paper P, the residual toner and the like on the surface of the photosensitive drum is removed by the cleaning section.

The fixing apparatus 43*b* performs the heat fixing of the toner image transferred on the paper P conveyed by the fed paper conveying section 42. The paper P processed by the fixing processing is conveyed to the sheet finishing section 50 from a carry-out port, being nipped by paper ejecting rollers in the carrying-out section 44.

The sheet finishing section 50 is equipped with a sort section performing sort processing of sheets on which images are formed, a punch unit performing punching processing, a staple unit performing stapling processing to a bundle of sheets of paper, a bending unit performing bending processing, a cutting unit performing cutting processing, and the like. The paper on which various kinds of processing have been performed or have not been performed is ejected to a copy receiving tray T3.

FIG. 6 shows a control block diagram of the image forming apparatus 2.

As shown in FIG. 6, the image forming apparatus 2 is composed of a main body section 2*a*, a printer controller 2*b*, and a sheet finishing section 50 connected to the main body section 2*a*. The image forming apparatus 2 is connected to the operation apparatus 1 on the network N through a local area network interface (LANIF) 24*b* of the printer controller 2*b* in the state capable of mutual transmission and reception of information.

The main body section 2*a* is composed of the image reading section 20, an operation display section 30, the print section 40, and an image control board 100. Incidentally, the same sections as the ones described in FIG. 5 are denoted by the same reference marks as those of FIG. 5, and their descriptions are omitted.

The image control board 100 is composed of the control section 110, a nonvolatile memory 120, a random access memory (RAM) 130, a read processing section 140, a compression IC 150, a dynamic random access memory (DRAM) control IC 160, an image memory 170, an expansion IC 180, and a write processing section 190.

The control section 110 is composed of a central processing unit (CPU) and the like, and performs the centralized control of the operations of each section of the image forming apparatus 2 in accordance with the various kinds of processing programs stored in the nonvolatile memory 120. For example, the control section 110 changes the modes of the image forming apparatus 2 among a copy mode, a printer mode, and a scanner mode in accordance with an instruction signal input from the operation display section 30 or the operation apparatus 1 to control copying, printing, reading of image data, and the like.

Moreover, the control section 110 transmits an image writing signal PVV to a print control section 400 of the print section 40. It is supposed that the on-state of the image writing signal PVV is the state in which the toner image formed on the photosensitive drum is transferred to the paper P in the transferring apparatus 43*a*, and that the off-state of the image writing signal PVV is the state in which the toner image formed on the photosensitive drum is not transferred to the paper P in the transferring apparatus 43*a*.

Moreover, the control section 110 reads a front cover setting program pertaining to the present embodiment from the nonvolatile memory 120 and job data from the RAM 130 in order to realize the present embodiment, and controls the setting of the front cover in cooperation with the read program and the data. If the divisions of document pages by the sheet finishing and the addition of a front cover are set in the operation display section 30 or the operation apparatus 1, then the control section 110 controls the image forming apparatus 2 so as to form images with the first sheet of each division being added as the front cover.

For example, the case where the divisions of the prost-processing of the document pages and the addition of the front cover are set is the case where: the page unit setting section G23*a* is checked; the specification of the staple ending position is performed in the list area G23*c*; the front cover setting section G21*a* is checked; and the first pamphlet setting button G21*d* is not checked.

In particular, if it is chosen to form the image of on the first document page of each division on the front cover (if the print button of the blank/print choosing button G21*b* is chosen), then the control section 110 allows the image forming section 43 to form the image of the first document page of each division on the front cover. On the other hand, if it is chosen to form a blank image on the front cover (if the blank button of the blank/print choosing button G21*b* is chosen), then the control section 11 allows the image forming section 43 to form the blank image on the front cover.

The nonvolatile memory 120 stores a front cover setting program according to the present embodiment, blank image data for forming a blank image, the data for setting the sheet finishing to the sheets P on which images are formed to the sheet finishing section 50 through the print section 40, the data processed by various programs, and the like, besides the various kinds of processing programs and the data pertaining to image formation.

The RAM 130 forms a work area for temporarily storing various programs to be executed by the control section 110, the data pertaining to the programs, job data, and the like.

FIG. 7 shows an example of the job data.

As shown in FIG. 7, the job data 131 is composed of the data common to each document page (page common data 131*a*) and the data peculiar to each document page (page data 131*b*).

The page common data 131*a* includes various setting conditions set on the basis of instruction signals input from the operation apparatus 1 and the operation display section 30 and the data indicating operation states of image formation operations and sheet finishing operations.

For example, as the page common data 131*a*, the set number of copies D1, the output number of copies D2, a copy mode D3, a sheet finishing mode D4, a body text tray D5, a front cover D6, a front cover tray D6*a*, a first pamphlet only D6*b*, a print page number D7, a division page counter D8, a number of read images D9, and the like can be cited.

The set number of copies D1 indicates the output number of copies of the paper P. The output number of copies D2 indicates the counted value of the number of copies that have been output. The copy mode D3 indicates the surface on which image data is formed, that is, from one side to both side printing, from both side to one side printing, or the like. The sheet finishing mode D4 indicates the set type of sheet finishing (the existence of a staple, a staple position, and the like).

The body text tray D5 indicates a paper feed tray set in the paper setting area G11, that is, the tray in which sheets on which the image of a document page is formed are stored.

The front cover D6 indicates the existence of the setting of the addition of a front cover, and whether to form the image of document page data on a front cover or whether to form an image of blank, that is, whether the front cover setting section G21*a* is checked or not ("none" in the case of no check). If the front cover setting section G21*a* is checked, the front cover D6 indicates the chosen button of the blank/print choosing button G21*b* ("blank" or "print"). The front cover tray D6*a* indicates the paper feed tray in which the paper to be a front cover when the front cover setting section G21*a* is checked is stored, that is, the paper feed tray indicated by the paper feed tray setting button G21*c*. The first pamphlet only D6*b* becomes effective when the front cover D6 is the blank or the print, and indicates whether to add a front cover only to the first division or not (for example, indicates the addition of a front cover only to a pamphlet formed of the first division by 0 when the first pamphlet setting button G21*d* is checked, and indicates the addition of a front cover to all of the pamphlets formed of all the divisions by 1 when the first pamphlet setting button G21*d* is not checked on the basis of the existence of the check).

The print page number D7 indicates the identification number of the individual piece of image data corresponding to the document page to be subjected to image formation processing. The division page counter D8 indicates the counted value of the page numbers of paper in each division of the document pages. The number of read images D9 indicates the total number n of the read individual pieces of image data.

Identification numbers (For example, page 1, page 2, . . . ) is added to the individual pieces of image data corresponding to the respective read document pages, and the identification numbers are individually stored as the page data. Each individual piece of image data is composed of an image storing address D11 indicating the address in the image memory 170 in which the individual piece of image data is stored, sheet finishing information D12 indicating the sheet finishing (the existence of a staple here) to each individual piece of image data set by the list area G23*c*, a division D13 indicating a division position (the existence of the specification of a staple ending position here) to each individual piece of image data, and the like.

The read processing section 140 performs various kinds of processing, such as analog processing, A/D conversion processing, and shading processing, to the analog image signal input from an image read control section 200 of the image reading section 20, and then generates digital image data. The generated image data is output to the compression IC 150.

The compression IC 150 performs compression processing to input digital image data to output the compressed image data to the DRAM control IC 160.

The DRAM control IC 160 controls the compression processing of image data by the compression IC 150 and the expansion processing of the compressed image data by the expansion IC 180 in accordance with instructions from the control section 110, and performs the input and output control of image data against the image memory 170. For example, when the save of an image signal read by the image reading section 20 is instructed, the DRAM control IC 160 allows the compression IC 150 to execute the compression processing of the image data input from the read processing section 140, and allows a compression memory 171 of the image memory 170 to store the compressed image data therein. Moreover, when the print output of the compressed image data stored in the compression memory 171 is instructed, the DRAM control IC 160 reads the compressed image data from the compression memory 171, and allows the expansion IC 180 to perform the expansion processing of the read compressed image data to allow a page memory 172 to store the expanded image data therein. Furthermore, when the print output of the image data stored in the page memory 172 is instructed, the DRAM control IC 160 reads the image data from the page memory 172 to output the read image data to the write processing section 190.

The image memory 170 includes the compression memory 171 and the page memory 172, each made of a dynamic RAM (DRAM). The compression memory 171 is a memory for storing compressed image data, and the page memory 172 is a memory for temporarily storing image data for print output.

The expansion IC 180 performs expansion processing to input compressed image data.

The write processing section 190 generates print data for image formation on the basis of the image data input from the DRAM control IC 160, and outputs the generated print data to the print section 40.

The image reading section 20 is composed of a CCD 22*a* and the image read control section 200, both shown in FIG. 6; and the automatic document sending section 21, the reading section 22, and the like, which are not shown here but shown in FIG. 5. The image read control section 200 controls the automatic document sending section 21, the reading section 22, and the like, to allow them to execute the exposure scanning of a document surface, and allows the CCD 22*a* to perform the photoelectric conversion of reflected light from the document surface to read the image thereof. The read analog image signal is output to the read processing section 140.

The operation display section 30 is composed of a liquid crystal display (LCD) 31, an operation display control section 300, and the other not shown operation key groups. A touch panel is provided over the LCD 31 so as to cover the LCD 31. The operation display control section 300 allows the LCD 31 to display various setting screens for inputting various setting conditions, various processing results, and the like, in accordance with display signals input from the control section 110. Moreover, the operation display control section 300 outputs operation signals input from the operation key group or the touch panel to the control section 110.

Moreover, various setting screens as shown in FIGS. 3 and 4 are displayed on the LCD 31 in the operation display section 30. The setting screens are provided with: the first input section to receive an input regarding the divisions of document pages to be execution objects of sheet finishing to set the divisions; the second input section to set the addition of a front cover; the third input section to receive the choice of the image to be formed on the front cover between the image of a document page and the image of a blank image; and the fourth input section to perform the setting of whether to add the front cover only to the first division among a plurality of divisions of the document pages or not.

The print section 40 is composed of the image forming section 43 and the like shown in FIG. 5 and the print control section 400. The print control section 400 controls the operations of each section of the print section 40, such as the image forming section 43, in accordance with instructions from the control section 110, and forms an image on sheets P on the basis of the pint data input from the write processing section 190. The print control section 400 further outputs instruction signals for operating each section of the sheet finishing section 50 to a sheet finishing control section 500 in accordance with the instructions from the control section 110.

Next, each section of the printer controller 2*b* is described. The printer controller 2*b* performs the management and the control of jobs input from the operation apparatus 1 connected to the network N into the image forming apparatus 2 when the image forming apparatus 2 is used as a network printer. The printer controller 2*b* receives the data to be printed from the operation apparatus 1, and transmits the received data to the main body section 2*a* as a job.

The printer controller 2*b* is composed of a controller control section 21*b*, a DRAM control IC 22*b*, an image memory 23*b*, and a LANIF 24*b*.

The controller control section 21*b* collectively controls the operations of each section of the printer controller 2*b*, and transmits the data input from the operation apparatus 1 to the main body section 2*a* through the LANIF 24*b* as data.

The DRAM control IC 22*b* controls the storing of the data received through the LANIF 24*b* into the image memory 23*b*, and the reading of data from the image memory 23*b*. Moreover, the DRAM control IC 22*b* is connected to the DRAM control IC 160 of the image control board 100 through a peripheral components interconnect (PCI) bus, and reads the data to be printed from the image memory 23*b* to output the read data to the DRAM control IC 160 in accordance with an instruction from the controller control section 21*b*.

The image memory 23*b* is composed of a DRAM, and temporarily stores input output data.

The LANIF 24*b* is a communication interface, such as a network interface card (NIC) or a modem, for connecting the image forming apparatus 2 to the network N, such as a LAN, and receives data from the operation apparatus 1. The received data is output to the DRAM control IC 22*b*.

The sheet finishing section 50 is provided with: various sheet finishing units, such as a sort unit, a punch unit, a staple unit, a bending unit, and a cutting unit; and conveying means, such as conveying rollers for conveying sheets to the various sheet finishing units. The various sheet finishing units are collectively controlled by the sheet finishing control section 500. The sheet finishing control section 500 performs the control of conveying the sheets P to predetermined processing units along the conveying paths, and of performing the drive control of each section so as to allow the sections to perform predetermined sheet finishing to the paper P, and further of ejecting the paper P to predetermined copy receiving trays, in accordance with the instruction signals of the sheet finishing input from the control section 110 through the print control section 400.

Next, the operations of the present embodiment are described.

FIGS. 8-11 show flowcharts of the front cover setting processing in the present embodiment. The flowcharts shown in FIGS. 8-11 show the processing executed by the control section 110.

Figure 8:
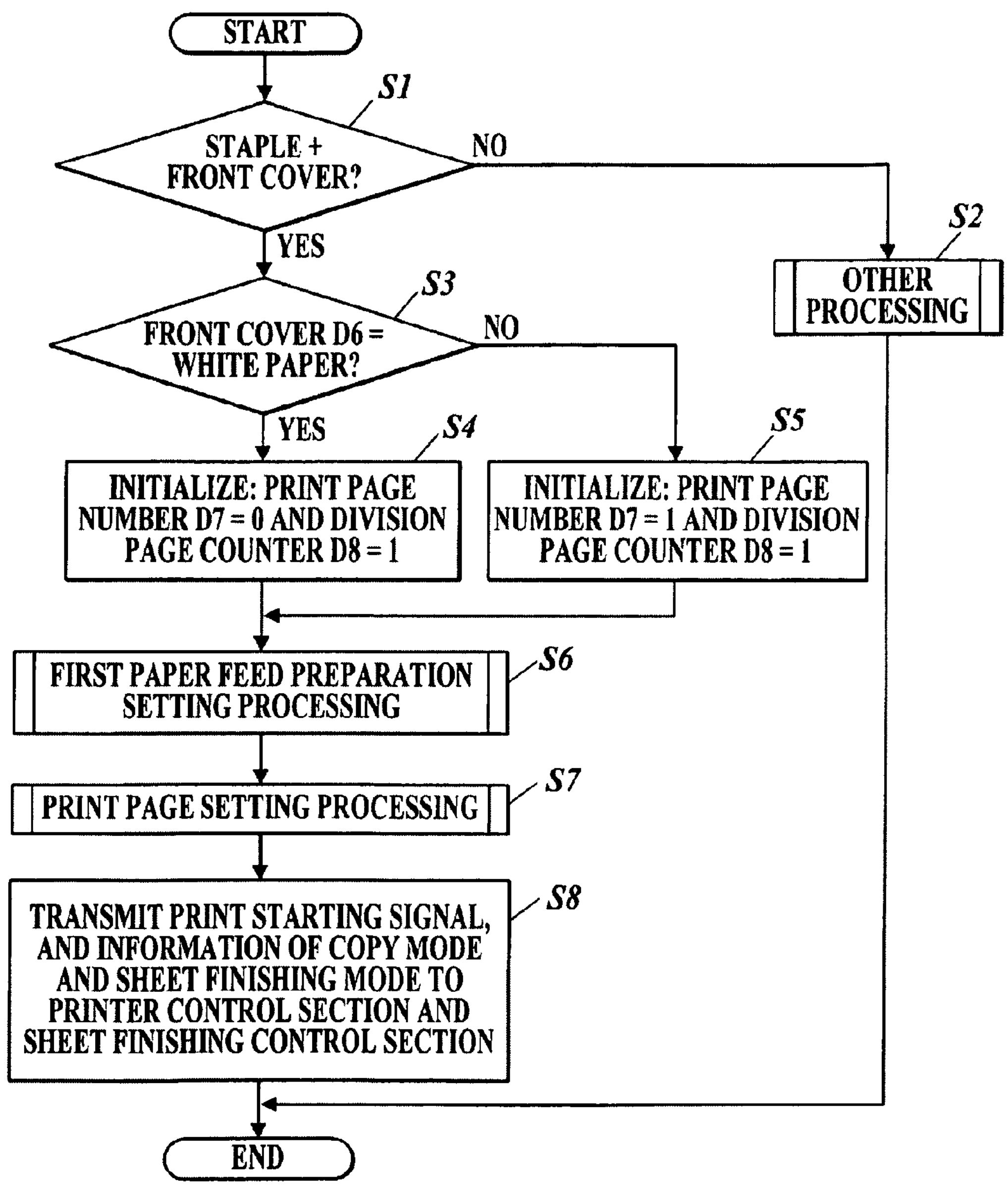
FIG. 8 is a flowchart of the processing that is executed at the time of starting image formation.

The flowchart shown in FIG. 8 shows the processing executed at the start of image formation.

If various setting conditions and image data are input in the operation apparatus 1 or the operation display section 30 before the start of the image formation, then the control section 110 first stores the input various setting conditions and the image data into the RAM 130 as job data, and refers to the job data to judge whether both of the sheet finishing mode D4 and the front cover D6 are set or not (whether the setting of a staple, and the setting of blank or print to a front cover exist or not) (Step S1).

If both of the sheet finishing mode D4 and the front cover D6 are not set (Step S1; No), then the control section 110 executes other processing (Step S2), and ends the present processing.

If both of the sheet finishing mode D4 and the front cover D6 are set (Step S1; Yes), then the control section 110 judges whether the front cover D6 is set to the blank or not (Step S3).

If the front cover D6 is set to the blank (Step S3; Yes), then the control section 110 initializes the print page number D7 of the job data to 0 and the division page counter D8 thereof to 1 (Step S4).

If the front cover D6 is not set to the blank, that is, if the front cover D6 is set to the print (Step S3; No), then the control section 110 initializes the print page number D7 of the job data to 1 and the division page counter D8 thereof to 1 (Step S5).

After the initialization at Step S4 or Step S5, the control section 110 executes the first paper feed preparation setting processing (Step S6) (see FIG. 9), which will be described below, and executes the print page setting processing (Step S7) (see FIG. 10), which will be described below, after the first paper feed preparation setting processing.

After the print page setting processing (after the processing at Step S7), the control section 110 transmits the copy mode D3 and the sheet finishing mode D4 of the job data to the print control section 400 and the sheet finishing control section 500 together with a print starting signal (Step S8), and ends the present processing.

Figure 9:
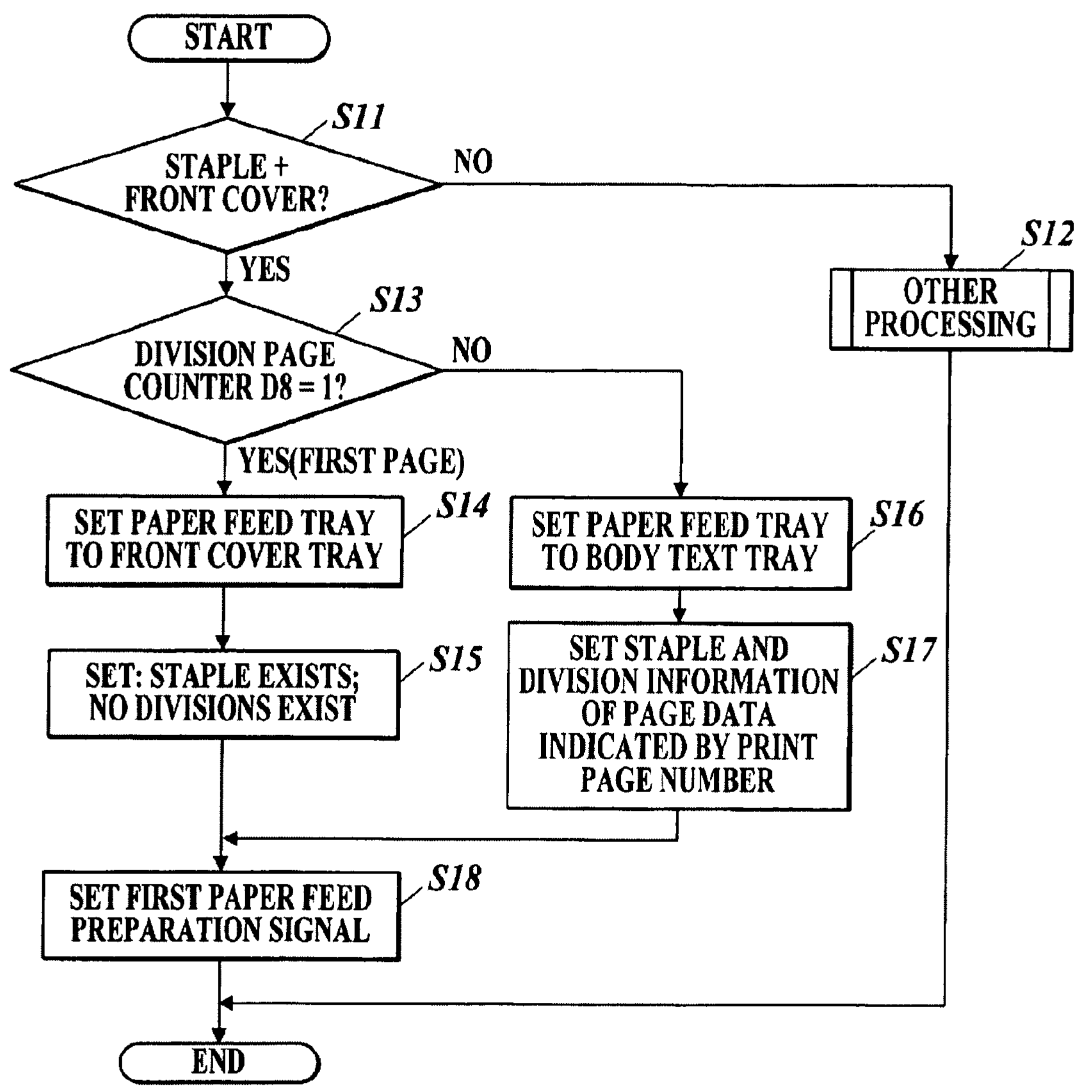
FIG. 9 is a flowchart of first paper feed preparation setting processing.

FIG. 9 shows the flowchart of the first paper feed preparation setting processing executed at Step S6 of FIG. 8. The first paper feed preparation setting processing is the processing for setting the tray in which the paper to be fed is stored, and the information of the print page data to the paper to be fed, for example, the data including the existence of a staple and the existence of division, when the paper feed section 41 feeds the paper.

The control section 110 judges whether both the sheet finishing mode D4 and the front cover D6 are set or not (whether the setting of a staple and the setting of the blank or the print to the front cover exist or not) by referring to the job data (Step S11).

If both of the sheet finishing mode D4 and the front cover D6 are not set (Step S11; No), then the control section 110 execute other processing (Step S12), and ends the present processing.

If both of the sheet finishing mode D4 and front cover D6 are set (Step S11; Yes), then the control section 110 judges whether the division page counter D8 of the job data is 1 or not, that is, whether the page is the first page of a division or not (Step S13).

If the division page counter D8 is 1 (Step S13; Yes), then the control section 110 sets the paper feed tray to which the paper is fed to the paper feed tray indicated by the front cover tray D6*a* (Step S14), and sets the staple to existing and the division to not-existing (Step S15).

If the division page counter D8 is not 1 (Step S13; No), then the control section 110 sets the paper feed tray to which the paper is fed to the paper feed tray indicated by the body text tray D8 (Step S16), and sets the staple and division information of the page data indicated by the print page number D7 (Step S17).

After the processing at Step S15 or Step S17, the control section 110 sets the set paper feed tray, and the settings of the existence of the staple and the existence of the divisions as a first paper feed preparation signal (Step S18). Then, the control section 110 ends the present processing.

Figure 10:
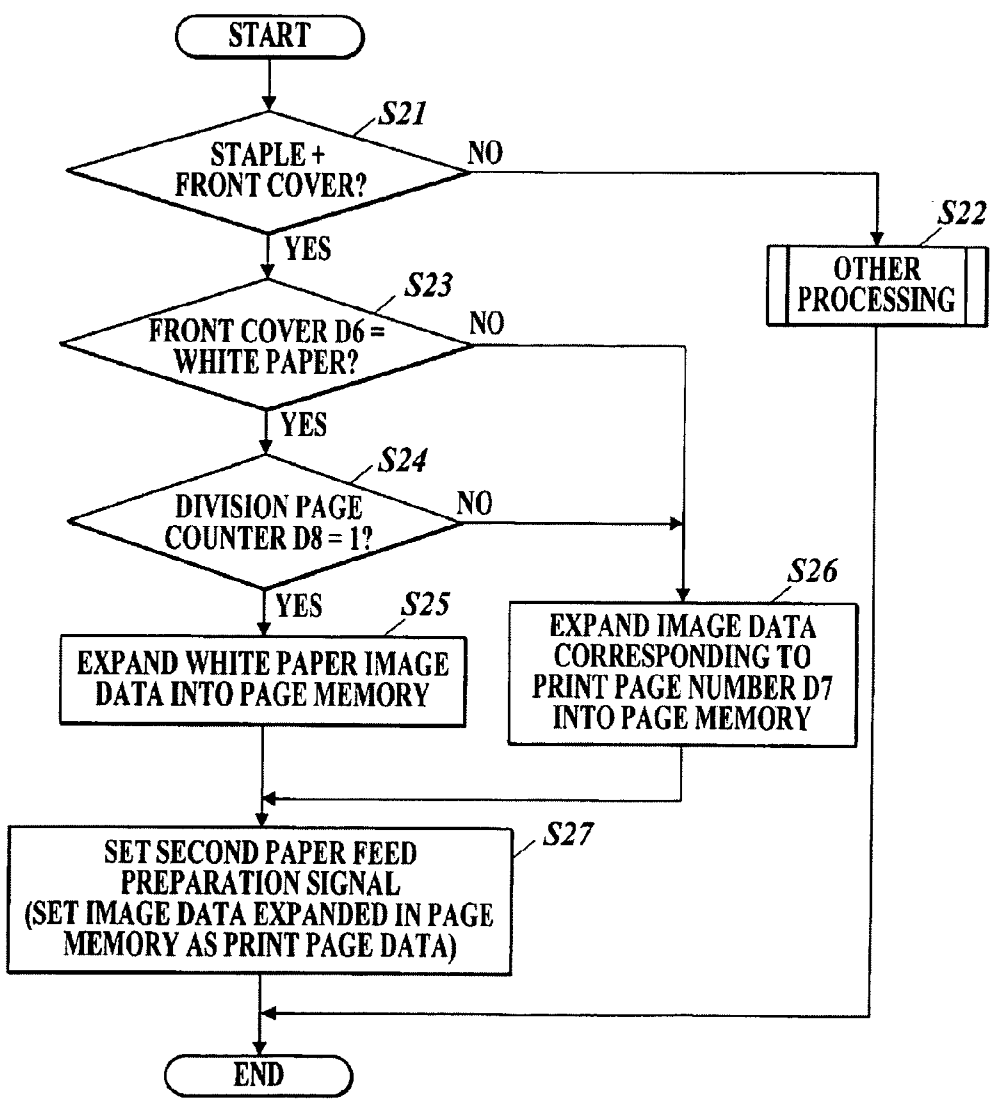
FIG. 10 is a flowchart of print page setting processing.

FIG. 10 shows the print page setting processing to be executed at Step S7 of FIG. 8. The print page setting processing is the processing to generate print page data according to the job data to which the individual piece of image data corresponding to each document page is set, and to set the generated print page data.

The control section 110 refers to the job data to judge whether both of the sheet finishing mode D4 and the front cover D6 are set or not (whether the setting of a staple and the setting of the blank or the print to a front cover exist or not) (Step S21).

If both of the sheet finishing mode D4 and the front cover D6 are not set (Step S21; No), then the control section 110 executes other processing (Step S22), and ends the present processing.

If both of the sheet finishing mode D4 and the front cover D6 are set (Step S21; Yes), then the control section 110 judges whether the front cover D6 is set to the blank or not (Step S23).

If the front cover D6 is set to the blank (Step S23; Yes), then the control section 110 judges whether the division page counter D8 of the job data is 1 or not, that is, the page is the first page of a division or not (Step S24).

If the division page counter D8 is 1 (Step S24; Yes), then the control section 110 expands the blank image data saved in the nonvolatile memory 120 into the page memory 172 (Step S25).

If the front cover D6 is not set to the blank, that is, if the front cover D6 is set to the print (Step S23; No), or if the division page counter D8 is not 1 (Step S24; No), then the control section 110 expands the individual piece of image data stored in the image storing address D11 corresponding to the identification number of the document page indicated by the print page number D7 into the page memory 172 (Step S26).

After the expansion of the image data into the page memory 172 (after the processing at Step S25 or Step S16), the control section 110 sets the image data expanded in the page memory 172 as the print page data, and sets the setting as the second paper feed preparation signal (Step S27). Then, the control section 110 ends the present processing.

Figure 11A:
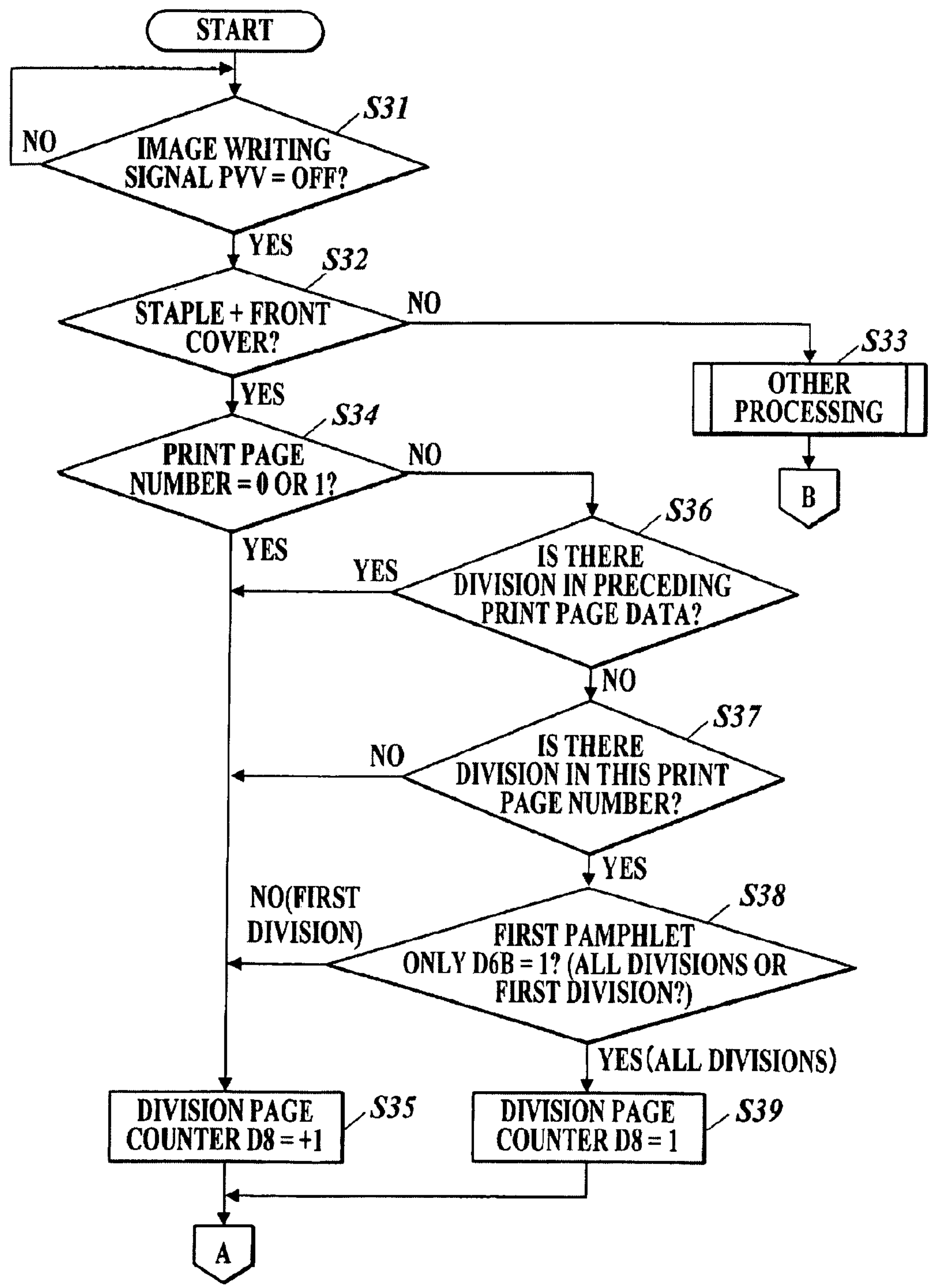
FIGS. 11A and 11B are flowcharts of the processing to be executed when an image writing signal PVV is changed from its on-state to its off-state after the start of image formation processing.
Figure 11B:
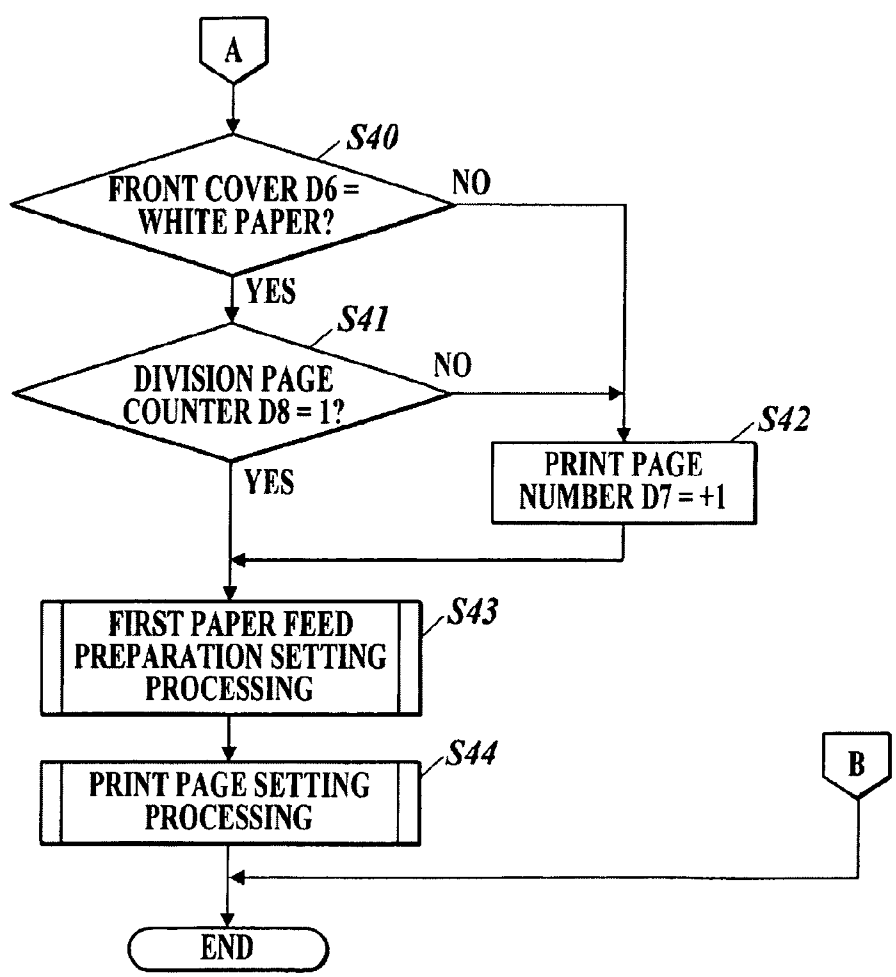

FIG. 11 shows the flowchart of the processing executed when the image writing signal PVV is changed from its on-state to its off-state after the start of image formation processing.

The control section 110 first judges whether the image writing signal PVV is changed from its on-state to its off-state or not (Step S31). If the image writing signal PVV is not changed to its off-state (Step S31; No), then the control section 110 waits until the image writing signal PVV is changed.

If the image writing signal PVV is changed from its on-state to its off-state (Step S31; Yes), then the control section 110 refers to the job data, and judges whether both of the sheet finishing mode D4 and the front cover D6 are set or not (whether the setting of a staple and the setting of the blank or the print in the front cover D6 exist or not) (Step S32).

If both of the sheet finishing mode D4 and the front cover D6 are not set (Step S32; No), then the control section 110 executes other processing (step S33), and ends the present processing.

If both of the sheet finishing mode D4 and the front cover D6 are set (Step S32; Yes), then the control section 110 judges whether the print page number D7 is 0 or 1 or not (Step S34). If the print page number D7 is 0 or 1 (Step S34; Yes), then the control section 110 adds 1 to the division page counter D8 (Step S35).

If the print page number D7 is neither 0 nor 1 (Step S34; No), then the control section 110 judges whether the division information D13 corresponding to the identification number of the document page preceding the identification number of the document page indicated by the print page number D7 by one (the identification number of the document page indicated by the adjacent print page number D7) exists or not (Step S36).

If the division information D13 corresponding to the identification number of the document page indicated by the adjacent print page number D7 exists (Step S36; Yes), then the control section 110 advances the processing to that at Step S35.

If the division information D13 corresponding to the identification number of the document page indicated by the adjacent print page number D7 does not exist (Step S36; No), then the control section 110 judges whether the division information D13 corresponding to the print page number D7 exists or not (Step S37).

If the division information D13 corresponding to the print page number D7 does not exist (Step S37; No), then the control section 110 advances the processing to that at Step S35.

If the division information D13 corresponding to the print page number D7 exists (Step S37; Yes), then the control section 110 performs the distinction about whether the first pamphlet only D6*b* of the job data is 1 or not, that is, whether the first pamphlet setting button G21*d* is checked or not, and consequently the control section 110 performs the judgment about whether to add a front cover only to a pamphlet formed of the first division among a plurality of divisions or whether to add a front cover to all the pamphlet formed by all of the divisions (Step S38).

If the first pamphlet only D6*b* is not 1, that is, if the first pamphlet setting button G21*d* is checked and the first pamphlet only D6*b* is 0, that is, if the front cover is added only to the pamphlet formed of the first division among the plurality of divisions (Step S38; No (the first division)), then the control section 110 advances the processing to that at Step S35.

If the first pamphlet only D6*b* is 1, that is, if the first pamphlet setting button G21*d* is not checked, that is, if a front cover is added to all the pamphlets formed of all the divisions among the plurality of divisions (Step S38; Yes (all divisions)), then the control section 110 sets 1 into the division page counter D8 (Step S39).

After the processing at Step S35 or Step S39, the control section 110 judges whether the front cover D6 is set to the blank or not (Step S40).

If the front cover D6 is set to the blank (Step S40; Yes), then the control section 110 judges whether the division page counter D8 of the job data is 1 or not, that is, whether the page is the first page of a division or not (Step S41).

If the front cover D6 is not set as the blank (Step S40; No), or if the division page counter D8 is not 1 (Step S41; No), then the control section 110 adds 1 to the print page number D7 (Step S42).

If the division page counter D8 is 1 (Step S41; Yes), or after the processing at Step S42, the control section 110 executes the aforesaid first paper feed preparation setting processing (see FIG. 9) (Step S43), and after the first paper feed preparation setting processing, the control section 110 executes the aforesaid print page setting processing (see FIG. 10) (Step S44). Then, the control section 110 ends the present processing.

Figure 13:
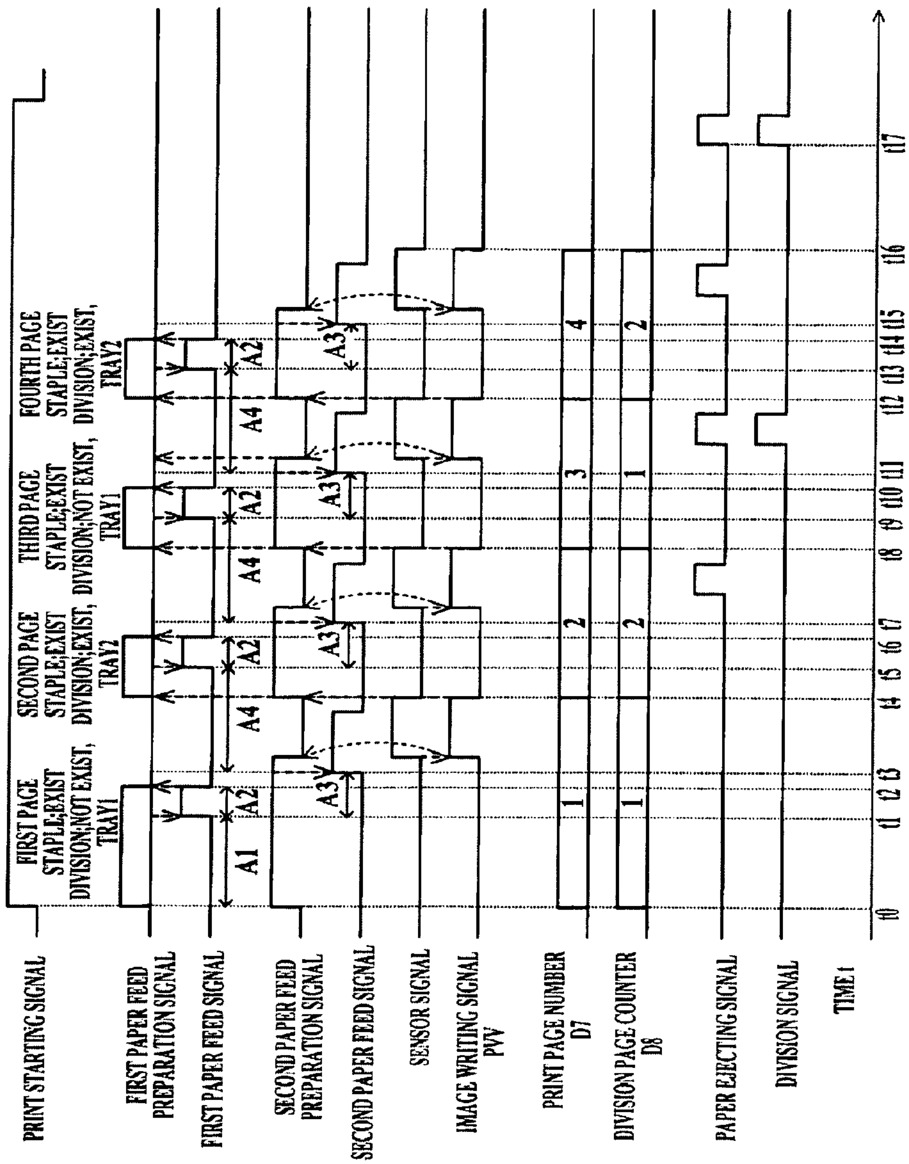
FIG. 13 is a diagram showing an example of a time chart of the operations of the image forming apparatus realizing the print processing of FIGS. 12A-12C.

FIGS. 12A, 12B, and 12C show image views of the print processing executed in the present embodiment, and FIG. 13 sows an example of a time chart of the operation of the image forming apparatus 2 realizing the processing of FIGS. 12A, 12B, and 12C.

FIGS. 12A, 12B, 12C, and 13 show an example of image formation processing in the case where: the staple setting section G13*a* is checked and stapling processing is performed at one position on the upper left; the front cover setting section G21*a* is checked; the print is chosen by the blank/print choosing button G21*b*; a tray 1 is set by the paper feed tray setting button G21*c* as the paper feed tray of the front cover; the first pamphlet setting button G21*d* is in the state of being not checked; the page unit setting section G23*a* is checked; and each document page is processed in the various setting conditions shown in the list area G23*c*, in the various setting screens shown in FIGS. 3 and 4.

FIG. 12A shows the image data composed of a plurality of individual pieces of image data corresponding to a plurality of document pages produced by application software in the operation apparatus 1. FIG. 12B shows the print data composed of a plurality of pieces of print page data formed on sheets in the image forming apparatus 2. FIG. 12C shows the images of bundles of paper after sheet finishing, which bundles are ejected from the image forming apparatus 2.

The image data generated by the operation apparatus 1, which image data is shown in FIG. 12A, is composed of individual pieces of image data I1-I4 corresponding to the respective document pages. When the image data is transmitted from the operation apparatus 1 to the image forming apparatus 2, the identification numbers for identifying the respective individual pieces of image data (for example, page 1, page 2 . . . ) is added from the individual piece of image data I1 to the individual piece of image data 14 in order, and the individual pieces of image data are stored as job data.

The print data shown in FIG. 12B is composed of the plurality of pieces of print page data Pd1-Pd4. The pieces of print page data Pd1 and Pd3 are formed on front covers. Incidentally, in FIG. 12B, the formation of the image views of the print page data Pd1 and Pd3 on the front covers are indicated by hatching them.

The images of the bundles of sheets of paper shown in FIG. 12C are image views of a pamphlet composed by the performance of the stapling processing of the print page data Pd1 formed on the front cover and the page data Pd2 formed on sheets in a bundle, and of a pamphlet composed by the performance of the stapling processing of the print page data Pd3 formed on the front cover and the print page data Pd4 formed on sheets in a bundle. Incidentally, in FIG. 12C, the image views of the sheets of the front covers are indicated as the front covers by hatching them.

Next, the example of the time chart of the operations of the image forming apparatus 2 shown in FIG. 13 is described by citing the cases of FIGS. 12A, 12B, and 12C as examples.

A first paper feed preparation signal is the data including the information of set print page data, for example, the existence of a staple, the existence of divisions, and a tray in which sheets to be fed are stored. The data is output from the control section 110 to the sheet finishing control section 500 through the print control section 400.

The first paper feed signal is an operation signal instructing the conveyance of sheets P from the paper feed trays 41*a* to the resist rollers 42*a*. The first paper feed signal indicates that the conveyance operation is being performed when the first paper feed signal is in its on-state, and the first paper feed signal is output from the print control section 400 to the control section 110 in response to the first paper feed preparation signal. After the second paper feed signal is turned on, the first paper feed signal is turned on after the elapse of a predetermined time (provided that the time of paper feeding of a first sheet is excluded). The predetermined time of each paper feed tray differs from one another.

The second paper feed preparation signal is a signal indicating the practicability of write operation of print page data. The second paper feed preparation signal indicates the state of the completion of the write preparation of the image to be written next when the second paper feed preparation signal is in its on-state, and indicates the state of being in write preparation of the image when the second paper feed preparation signal is in its off-state. The second paper feed preparation signal is output from the control section 110 to the print control section 400.

The second paper feed signal is an operation signal instructing the conveyance of sheets P from the resist rollers 42*a* to the transferring apparatus 43*a*. The second paper feed signal indicates that the conveyance operation is being performed when the second paper feed signal is in its on-state, and the second paper feed signal is output from the print control section 400 to the control section 110 in response to the second paper feed preparation signal. After the first paper feed signal is turned on, the second paper feed signal is turned on after the elapse of a predetermined time.

The sensor signal is turned on when the leading edge of a sheet is detected by a sensor 42*b*, which is provided on a conveyance path through which the sheet is conveyed from the resist rollers 42*a* to the transferring apparatus 43*a*, and is turned off when the end edge of the sheet is detected.

When the sensor signal is turned on, the image writing signal PVV is turned on, and writing is started. When the writing of set print page data for one page has ended, the image writing signal PVV is turned off. When the image writing signal PVV is turned off, the first paper feed preparation signal and the second paper feed preparation signal are turned on.

The paper ejecting signal is an operation signal instructing the ejection of the sheets on which an image has been formed from the print section 40 to the sheet finishing section 50. The paper ejecting signal indicate that sheets are being ejected when the paper ejecting signal is in its on-state, and the paper ejecting signal is output from the print control section 400 to the sheet finishing control section 500.

The division signal is a signal indicating whether an image that is formed on a sheet is print page data indicating the existence of divisions or not when the paper is being ejected. When the division signal is in its on-state, the division signal indicates the existence of the divisions. The division signal is output from the print control section 400 to the sheet finishing control section 500.

First, at time t0, before a start of image formation, by the execution of the processing shown in FIGS. 8-10, the various setting conditions set by the operation apparatus 1 or the operation display section 30 and image data are stored in the RAM 130 as job data, and the job data is referred to for the judgment of whether both of the sheet finishing mode D4 and the front cover D6 are set or not (whether the setting of a staple and the setting of the blank or the print on a front cover exist or not). Moreover, whether the front cover D6 is set to the blank or not is judged. Because the setting is performed to the print in the example shown in FIGS. 12A, 12B, and 12C, the print page number D7 and the division page counter D8 of the job data are initialized to be 1 and 1, respectively. Because the division page counter D8 is 1, the paper feed tray is set to the paper feed tray indicated by the front cover tray D6*a*, and a first paper feed preparation signal indicating the existence of the staple and inexistence of the divisions is set. Moreover, because the front cover D6 is set to the print, the individual piece of image data corresponding to a print page number (D7=1) is expanded into the page memory 172, and the individual piece of image data expanded in the page memory 172 is set as the print page data Pd1. Then the second paper feed preparation signal is set. The copy mode D3 and the sheet finishing mode D4 of the job data are transferred to the print control section 400 and the sheet finishing control section 500, respectively, together with the print starting signal, and the first paper feed preparation signal and the second paper feed preparation signal are turned on.

At time t1, a predetermined time A1 has elapsed from the time to when the first paper feed preparation signal was turned on, and the first paper feed signal is turned on. Then, sheets are conveyed from the paper feed trays 41*a* to the resist rollers 42*a*.

At time t2, a predetermined time A2 has elapsed from the time t1 when the first paper feed signal was turned on, and the first paper feed signal is turned off. When the first paper feed signal is turned off, the first paper feed preparation signal is turned off.

At time t3, a predetermined time A3 has elapsed from the time t1 when the first paper feed signal was turned on, and the second paper feed signal is turned on. When the second paper feed signal is turned on, the sheets are conveyed from the resist rollers 42*a* to the transferring apparatus 43*a*. After that, when the leading edge of the paper is detected by the sensor 42*b*, the image writing signal PVV is turned on, and writing is started. The image formation of a first page of paper is then performed on the basis of the set print page data Pd1. Moreover, when the image writing signal PVV is turned on, the second paper feed preparation signal is turned off.

At time t4, when the image writing ends and the image writing signal PVV is changed from its on-state to its off-state, the processing shown in FIGS. 9-11 is executed. Because the print page number D7 is 1, 1 is added to the value of the division page counter D8, and the value of the division page counter D8 is set to 2. Moreover, because the front cover D6 is the print, 1 is added to the print page number D7, and the print page number D7 is set to 2. Then, because the division page counter D8 is not 1, the paper feed tray is set as the paper feed tray indicated by the body text tray D5, and the first paper feed preparation signal indicating the staple and division information of the page data indicated by the print page number D7 is set. Furthermore, because the front cover D6 is set to the print, the individual piece of image data corresponding to the print page number (D7=2) is expanded into the page memory 172, and the individual piece of image data expanded into the page memory 172 is set as the print page data Pd2. The second paper feed preparation signal is also set, and the first paper feed preparation signal and the second paper feed preparation signal are turned on.

At time t5, a predetermined time A4 has elapsed from the time t3 when the second paper feed signal was turned on, and the first paper feed signal is turned on. Then, sheets are conveyed from the paper feed trays 41*a* to the resist rollers 42*a*.

At time t6, the predetermined time A2 has elapsed from the time t5 when the first paper feed signal was turned on, and the first paper feed signal is turned off. When the first paper feed signal is turned off, the first paper feed preparation signal is turned off.

At time t7, the predetermined time A3 has elapsed from the time t5 when the first paper feed signal was turned on, and the second paper feed signal is turned on. When the second paper feed signal is turned on, the sheets are conveyed from the resist rollers 42*a* to the transferring apparatus 43*a*. After that, when the leading edge of the paper is detected by the sensor 42*b*, the image writing signal PVV is turned on, and writing is started. Then, the image formation of a second page of paper is performed on the basis of the print page data Pd2. Moreover, when the image writing signal PVV is turned on, the second paper feed preparation signal is turned off.

During a time t7-t8, the first page of paper is ejected to the sheet finishing section 50.

At time t8, the image writing ends, and the image writing signal PVV is turned off. When the image writing signal PVV is changed from its on-state to its off-state at that time, the processing shown in FIGS. 9-11 is executed. Because the present conditions are as follows: the print page number D7 is 2; the adjacent print page data Pd1 of the presently set print page data Pd2 has no divisions; the individual piece of image data corresponding to the print page number D7 (D7=2) has divisions; and the first pamphlet only D6*b* of job data is 1, the division page counter D8 is consequently initialized to 1. Moreover, because the front cover D6 is the print, 1 is added to the print page number D7, and the print page number D7 is set to 3. Then, because the division page counter D8 was changed to 1, the paper feed tray is set to the paper feed tray indicated by the front cover tray D6*a*, and the first paper feed preparation signal indicating the existence of the staple and the inexistence of the divisions is set. Furthermore, because the front cover D6 is set to the print, the individual piece of image data corresponding to the print page number (D7=3) is expanded in the page memory 172, and the individual piece of image data expanded in the page memory 172 is set as the print page data Pd3. Moreover, the second paper feed preparation signal is set, and the first paper feed preparation signal and the second paper feed preparation signal are turned on.

At time t9, the predetermined time A4 has elapsed from the time t7 when the second paper feed signal was turned on, and the first paper feed signal is turned on. Then, sheets are conveyed from the paper feed trays 41*a* to the resist rollers 42*a*.

At time t10, the predetermined time A2 has elapsed from the time t9 when the first paper feed signal was turned on, and the first paper feed signal is turned off. When the first paper feed signal is turned off, the first paper feed preparation signal is turned off.

At time t11, the predetermined time A3 has elapsed from the time t9 when the first paper feed signal was turned on, and the second paper feed signal is turned on. When the second paper feed signal is turned on, the sheets are conveyed from the resist rollers 42*a* to the transferring apparatus 43*a*. After that, when the leading edge of the paper is detected by the sensor 42*b*, the image writing signal PVV is turned on, and writing is started. The image formation of a third page of paper is then performed on the basis of the set print page data Pd3. Moreover, when the image writing signal PVV is turned on, the second paper feed preparation signal is turned off.

During a time t11-t12, because the second page of paper is ejected to the sheet finishing section 50 and the division signal becomes its on-state, stapling processing is performed to the bundle of the first page and the second page of paper that have been ejected to the sheet finishing section 50.

At time t12, the writing of the image ends, and the image writing signal PVV is changed from its on-state to its off-state. Then, the processing shown in FIGS. 9-11 is executed. Because the print page number D7 is 3 and the adjacent print page data Pd2 of the presently set print page data Pd3 has divisions, 1 is added to the value of the division page counter D8, and the value of the division page counter D8 is set to 2. Moreover, because the front cover D6 is the print, 1 is added to the print page number D7, and the print page number D7 is set to 4. Then, because the division page counter D8 is not 1, the paper feed tray is set to the paper feed tray indicated by the body text tray D5, and the first paper feed preparation signal indicating the staple and division information of the page data indicated by the print page number D7 is set. Furthermore, because the front cover D6 is set to the print, the individual piece of image data corresponding to the print page number (D7=4) is expanded in the page memory 172, and the individual piece of image data expanded in the page memory 172 is set as the print page data Pd4. Then, the second paper feed preparation signal is set, and the first paper feed preparation signal and the second paper feed preparation signal are turned on.

At time t13, the predetermined time A4 has elapsed from the time t11 when the second paper feed signal was turned on, and the first paper feed signal is turned on. Then, sheets are conveyed from the paper feed trays 41*a* to the resist rollers 42*a*.

At time t14, the predetermined time A2 has elapsed from the time t13 when the first paper feed signal was turned on, and the first paper feed signal is turned off. When the first paper teed signal is turned off, the first paper feed preparation signal is turned off.

At time t15, the predetermined time A3 has elapsed from the time t13 when the first paper feed signal was turned on, and the second paper feed signal is turned on. When the second paper feed signal is turned on, the sheets are conveyed from the resist rollers 42*a* to the transferring apparatus 43*a*. After that, when the leading edge of the paper is detected by the sensor 42*b*, the image writing signal PVV is turned on, and the writing is started. The image formation of the fourth page of paper is performed on the basis of the set print page data Pd4. Moreover, when the image writing signal PVV is turned on, the second paper feed preparation signal is turned off.

During a time t15-t16, the third page of paper is ejected to the sheet finishing section 50.

At the time t16, the writing of the image ends, and the image writing signal PVV is changed from its on-state to its off-state.

Then, at time t17, the fourth page of paper is ejected to the sheet finishing section 50, and the division signal becomes its on-state. Consequently, stapling processing is performed to the bundle of the third page and the fourth page of paper ejected to the sheet finishing section 50, and the print processing ends.

FIGS. 14A, 14B, and 14C show other image views of the print processing executed in the present embodiment, and FIG. 15 shows an example of the time chart of the operations of the image forming apparatus 2 realizing the print processing of FIGS. 14A, 14B, and 14C.

The conditions of the case shown in FIGS. 14A, 14B, 14C, and 15 are the same as those of the FIGS. 12A, 12B, 12C, and 13 except for the checking of the front cover setting section G21*a* and the choice of the blank with the blank/print choosing button G21*b*. The descriptions of the particulars set in the various setting screens shown in FIGS. 3 and 4 are omitted.

FIG. 14A shows the image data composed of the plurality of individual pieces of image data corresponding to the plurality of document pages produced by application software in the operation apparatus 1. FIG. 14B shows the print data composed of the plurality of pieces of print page data formed on sheets in the image forming apparatus 2. FIG. 14C shows the image of a bundle of sheets of paper after the sheet finishing, which paper is ejected from the image forming apparatus 2.

The image data generated by the operation apparatus 1, which image data is shown in FIG. 14A, is composed of individual pieces of image data I1-I4 corresponding to each document page. When the image data is transmitted from the operation apparatus 1 to the image forming apparatus 2, the identification numbers for identifying the respective individual pieces of image data (for example, page 1, page 2 . . . ) are added to the individual pieces of image data I1-I4 in order, and the individual pieces of image data I1-I4 are stored as job data.

The print data shown in FIG. 14B is composed of the plurality of pieces of print page data Pd01, Pd02, and Pd1-Pd4. The pieces of print page data Pd01 and Pd02 are the print page data generated on the basis of the blank image data that is previously set. Incidentally, in FIG. 14B, the formation of the image views of the print page data Pd01 and Pd02 as front covers are indicated by hatching them.

The images of the bundles of sheets of paper shown in FIG. 14C are image views of a pamphlet composed by the performance of the stapling processing of the print page data Pd01 formed on a front cover and the page data Pd1 and Pd2 formed on sheets of paper as a bundle of paper, and of a pamphlet composed by the performance of the stapling processing of the print page data Pd02 formed on a front cover and the print page data Pd3 and Pd4 formed on sheets of paper as a bundle of paper. Incidentally, in FIG. 14C, the image views of the sheets of the front covers are indicated as the front covers by hatching them.

Next, the example of the time chart of the operations of the image forming apparatus 2 shown in FIG. 15 is described by citing the cases of FIGS. 14A, 14B, and 14C as examples. Because various signals are the same as those shown in FIG. 13, their descriptions are omitted.

First, at time t20, before a start of image formation, by the execution of the processing shown in FIGS. 8-10, the various setting conditions set with the operation apparatus 1 or the operation display section 30 and image data are stored in the RAM 130 as job data, and the job data is referred to for the judgment of whether both of the sheet finishing mode D4 and the front cover D6 are set or not (whether the setting of a staple and the setting of the blank or the print on a front cover exist or not). Moreover, whether the front cover D6 is set to the blank or not is judged. Because the setting is performed to the blank in the example shown in FIGS. 14A, 14B, and 14C, the print page number D7 and the division page counter D8 of the job data are initialized to be 0 and 1, respectively. Because the division page counter D8 is 1, the paper feed tray is set to the paper feed tray indicated by the front cover tray D6*a*, and a first paper feed preparation signal indicating the existence of a staple and inexistence of divisions is set. Moreover, because the front cover D6 is set to the blank and the division page counter D8 is 1, the blank image data is expanded into the page memory 172, and the blank image data expanded in the page memory 172 is set as the print page data Pd01. Then, the second paper feed preparation signal is set. The copy mode D3 and the sheet finishing mode D4 of the job data are transmitted to the print control section 400 and the sheet finishing control section 500, respectively, together with the print starting signal, and the first paper feed preparation signal and the second paper feed preparation signal are turned on.

At time t21, the predetermined time A1 has elapsed from the time t20 when the first paper feed preparation signal was turned on, and the first paper feed signal is turned on. Then, sheets are conveyed from the paper feed trays 41*a* to the resist rollers 42*a*.

At time t22, the predetermined time A2 has elapsed from the time t21 when the first paper feed signal was turned on, and the first paper feed signal is turned off. When the first paper feed signal is turned off, the first paper feed preparation signal is turned off.

At time t23, the predetermined time A3 has elapsed from the time t21 when the first paper feed signal was turned on, and the second paper feed signal is turned on. When the second paper feed signal is turned on, the sheets are conveyed from the resist rollers 42*a* to the transferring apparatus 43*a*. After that, when the leading edge of the paper is detected by the sensor 42*b*, the image writing signal PVV is turned on, and writing is started. The image formation of a first page of paper is then performed by the set print page data Pd01. Moreover, when the image writing signal PVV is turned on, the second paper feed preparation signal is turned off.

At time t24, the image writing ends, and the image writing signal PVV is changed from its on-state to its off-state. Then, the processing shown in FIGS. 9-11 is executed. Because the print page number D7 is 0, 1 is added to the value of the division page counter D8, and the value of the division page counter D8 is set to 2. Moreover, because the front cover D6 is the blank and the division page counter D8 is not 1, 1 is added to the print page number D7, and the print page number D7 is set to 1. Then, because the division page counter D8 is not 1, the paper feed tray is set as the paper feed tray indicated by the body text tray D5, and the first paper feed preparation signal indicating the staple and division information of the page data indicated by the print page number D7 is set. Furthermore, because the front cover D6 is set to the blank and the division page counter D8 is not 1, the individual piece of image data corresponding to the print page number (D7=1) is expanded into the page memory 172, and the individual piece of image data expanded into the page memory 172 is set as the print page data Pd1. The second paper feed preparation signal is also set, and the first paper feed preparation signal and the second paper feed preparation signal are turned on.

At time t25, the predetermined time A4 has elapsed from the time t23 when the second paper feed signal was turned on, and the first paper feed signal is turned on. Then, sheets are conveyed from the paper feed trays 41*a* to the resist rollers 42*a*.

At time t26, the predetermined time A2 has elapsed from the time t25 when the first paper feed signal was turned on, and the first paper feed signal is turned off. When the first paper feed signal is turned off, the first paper feed preparation signal is turned off.

At time t27, the predetermined time A3 has elapsed from the time t25 when the first paper feed signal was turned on, and the second paper feed signal is turned on. When the second paper feed signal is turned on, the sheets are conveyed from the resist rollers 42*a* to the transferring apparatus 43*a*. After that, when the leading edge of the paper is detected by the sensor 42*b*, the image writing signal PVV is turned on, and writing is started. Then, the image formation of a second page of paper is performed by the set print page data Pd1. Moreover, when the image writing signal PVV is turned on, the second paper feed preparation signal is turned off.

During a time t27-t28, the first page of paper is ejected to the sheet finishing section 50.

At time t28, the writing of the image ends. When the image writing signal PVV is changed from its on-state to its off-state at that time, the processing shown in FIGS. 9-11 is executed. Because the print page number D7 is 1, 1 is added to the division page counter D8, and the division page counter D8 is set to 3. Moreover, because the front cover D6 is the blank and the division page counter D8 is not 1, 1 is added to the print page number D7, and the print page number D7 is set to 2. Then, because the division page counter D8 is not 1, the paper feed tray is set to the paper feed tray indicated by the body text tray D5, and the first paper feed preparation signal indicating the staple and division information of the page data indicated by the print page number D7 is set. Furthermore, because the front cover D6 is set to the blank and the division page counter D8 is not 1, the individual piece of image data corresponding to the print page number (D7=2) is expanded into the page memory 172, and the individual piece of image data expanded in the page memory 172 is set as the print page data Pd2. Moreover, the second paper feed preparation signal is set, and the first paper feed preparation signal and the second paper feed preparation signal are turned on.

At time t29, the predetermined time A4 has elapsed from the time t27 when the second paper feed signal was turned on, and the first paper feed signal is turned on. Then, sheets are conveyed from the paper feed trays 41*a* to the resist rollers 42*a*.

At time t30, the predetermined time A2 has elapsed from the time t29 when the first paper feed signal was turned on, and the first paper feed signal is turned off. When the first paper feed signal is turned off, the first paper feed preparation signal is turned off.

At time t31, the predetermined time A3 has elapsed from the time t29 when the first paper feed signal was turned on, and the second paper feed signal is turned on. When the second paper feed signal is turned on, the sheets are conveyed from the resist rollers 42*a* to the transferring apparatus 43*a*. After that, when the leading edge of the paper is detected by the sensor 42*b*, the image writing signal PVV is turned on, and writing is started. The image formation of a third page of paper is then performed by the set print page data Pd2. Moreover, when the image writing signal PVV is turned on, the second paper feed preparation signal is turned off.

During a time t31-t32, a second page of paper is ejected to the sheet finishing section 50.

At time t32, the writing of the image ends, and the image writing signal PVV is changed from its on-state to its off-state. Then, the processing shown in FIGS. 9-11 is executed. Because the present conditions are as follows: the print page number D7 is 2; the adjacent print page data Pd1 of the presently set print page data Pd2 has no divisions; the individual piece of image data corresponding to the print page number D7 (D7=2) has divisions; and the first pamphlet only D6*b* of the job data is 1, the division page counter D8 is initialized to 1. Moreover, because the front cover D6 is the white print and the division page counter D8 is 1, the print page number D7 is not altered but held to 2. Then, because the division page counter D8 becomes 1, the paper feed tray is set to the paper feed tray indicated by the front cover tray D6*b*, and the first paper feed preparation signal indicating the existence of a staple and the inexistence of divisions is set. Furthermore, because the front cover D6 is set to the blank and the division page counter D8 is 1, the blank image data is expanded in the page memory 172, and the blank image data expanded in the page memory 172 is set as the print page data Pd02. Then, the second paper feed preparation signal is set. The copy mode D3 and the sheet finishing mode D4 are transmitted to the print control section 400 and the sheet finishing control section 500, respectively, together with a print starting signal. Moreover, the first paper feed preparation signal and the second paper feed preparation signal are turned on.

At time t33, the predetermined time A4 has elapsed from the time t31 when the second paper feed signal was turned on, and the first paper feed signal is turned on. Then, sheets are conveyed from the paper feed trays 41*a* to the resist rollers 42*a*.

At time t34, the predetermined time A2 has elapsed from the time t33 when the first paper feed signal was turned on, and the first paper feed signal is turned off. When the first paper feed signal is turned off, the first paper feed preparation signal is turned off.

At time t35, the predetermined time A3 has elapsed from the time t33 when the first paper feed signal was turned on, and the second paper feed signal is turned on. When the second paper feed signal is turned on, the sheets are conveyed from the resist rollers 42*a* to the transferring apparatus 43*a*. After that, when the leading edge of the paper is detected by the sensor 42*b*, the image writing signal PVV is turned on, and the writing is started. The image formation of the fourth page of paper is performed on the basis of the set print page data Pd02. Moreover, when the image writing signal PVV is turned on, the second paper feed preparation signal is turned off.

During a time t35-t36, the third page of paper is ejected to the sheet finishing section 50, and the division signal becomes its on-state. Then, the stapling processing of the bundle of the sheets of paper of from the first page to the third page, which have been ejected to the sheet finishing section 50, is performed.

At the time t36, the writing of the image ends, and the image writing signal PVV is changed from its on-state to its off-state. Then, the processing shown in FIGS. 9-11 is executed.

Because the print page number D7 is 2 and the adjacent print page data Pd2 of the presently set print page data Pd02 has divisions, 1 is added to the division page counter D8, and the division page counter D8 is set to 2. Moreover, because the front cover D6 is the blank and the division page counter D8 is not 1, 1 is added to the print page number D7, and the print page number D7 is set to 3. Then, because the division page counter D8 is not 1, the paper feed tray is set to the paper feed tray indicated by the body text tray D5, and the first paper feed preparation signal indicating the staple and division information of the page data indicated by the print page number D7 is set. Furthermore, because the front cover D6 is set to the blank and the division page counter D8 is not 1, the individual piece of image data corresponding to the print page number (D7=3) is expanded in the page memory 172, and the individual piece of image data expanded in the page memory 172 is set as the print page data Pd3. Moreover, the second paper feed preparation signal is set, and the first paper feed preparation signal and the second paper feed preparation signal are turned on.

At time t37, the predetermined time A4 has elapsed from the time t35 when the second paper feed signal was turned on, and the first paper feed signal is turned on. Then, sheets are conveyed from the paper feed trays 41*a* to the resist rollers 42*a*.

At time t38, the predetermined time A2 has elapsed from the time t37 when the first paper feed signal was turned on, and the first paper feed signal is turned off. When the first paper feed signal is turned off, the first paper feed preparation signal is turned off.

At time t39, the predetermined time A3 has elapsed from the time t37 when the first paper feed signal was turned on, and the second paper feed signal is turned on. When the second paper feed signal is turned on, the sheets are conveyed from the resist rollers 42*a* to the transferring apparatus 43*a*. After that, when the leading edge of the paper is detected by the sensor 42*b*, the image writing signal PVV is turned on, and writing is started. The image formation of a fifth page of paper is then performed on the basis of the set print page data Pd3. Moreover, when the image writing signal PVV is turned on, the second paper feed preparation signal is turned off.

During a time t39-t40, the third page of paper is ejected to the sheet finishing section 50.

At time t40, the writing of the image ends, and the image writing signal PVV is changed from its on-state to its off-state. Then, the processing shown in FIGS. 9-11 is executed. Because the present conditions are as follows: the print page number D7 is 3; the adjacent print page data Pd02 of the presently set print page data Pd3 has no divisions; and the individual piece of image data corresponding to the print page number D7 (D7=3) has no divisions, 1 is added to the value of the division page counter D8, and the value of the division page counter D8 is set to 3. Moreover, because the front cover D6 is the white page and the division page counter D8 is not 1, 1 is added to the print page number D7, and the print page number D7 is set to 4. Then, because the division page counter D8 is not 1, the paper feed tray is set to the paper feed tray indicated by the body text tray D5, and the first paper feed preparation signal indicating the staple and division information of the page data indicated by the print page number D7 is set. Furthermore, because the front cover D6 is set to the blank and the division page counter D8 is not 1, the individual piece of image data corresponding to the print page number (D7=4) is expanded in the page memory 172, and the individual piece of image data expanded in the page memory 172 is set as the print page data Pd4. Then, the second paper feed preparation signal is set, and the first paper feed preparation signal and the second paper feed preparation signal are turned on.

At time t41, the predetermined time A4 has elapsed from the time t39 when the second paper feed signal was turned on, and the first paper feed signal is turned on. Then, sheets are conveyed from the paper feed trays 41*a* to the resist rollers 42*a*.

At time t42, the predetermined time A2 has elapsed from the time t41 when the first paper feed signal was turned on, and the first paper feed signal is turned off. When the first paper feed signal is turned off, the first paper feed preparation signal is turned off.

At time t43, the predetermined time A3 has elapsed from the time t41 when the first paper feed signal was turned on, and the second paper feed signal is turned on. When the second paper feed signal is turned on, the sheets are conveyed from the resist rollers 42*a* to the transferring apparatus 43*a*. After that, when the leading edge of the paper is detected by the sensor 42*b*, the image writing signal PVV is turned on, and the writing is started. The image formation of the sixth page of paper is performed on the basis of the set print page data Pd4. Moreover, when the image writing signal PVV is turned on, the second paper feed preparation signal is turned off.

During a time t43-t44, the fifth page of paper is ejected to the sheet finishing section 50.

At the time t44, the writing of the image ends, and the image writing signal PVV is changed from its on-state to its off-state.

Then, at time t45, the sixth page of paper is ejected to the sheet finishing section 50, and the division signal becomes its on-state. Consequently, stapling processing is performed to the bundle of sheets of from the fourth page to the sixth page, which have been ejected to the sheet finishing section 50, and the print processing ends.

As described above, according to the present embodiment, if the divisions of document pages by the sheet finishing (for example, stapling processing) are set and the addition of front covers is set, then it is possible to allow the image forming section 43 to form an image on the first sheet of each division as a front cover. Consequently, the present embodiment spares a user the trouble of performing the front cover setting every division of document pages or every document pages to which the sheet finishing is executed, and the usability to the user can be improved.

Moreover, a user can arbitrarily choose a particular between the formation of an image of a document page on a front cover and the formation of a blank image on a front cover. If the formation of the image of the first document page of each division on a front cover is chosen, then it is possible to allow the image forming section 43 to form the image of the first document page of each division on the front cover. Moreover, if the formation of the blank image on a front cover is chosen, then it is possible to allow the image forming section 43 to form the blank image on the front cover.

Furthermore, a user can arbitrarily choose the setting of whether to perform the addition of a front cover only to the first division among a plurality of divisions of document pages or not, and then the convenience to the user can be improved.

Incidentally, the contents of the present invention are not limited to those of the embodiments described above, but the contents can be suitably changed without departing from the scope of the present invention.

According to an aspect of the preferred embodiment of the present invention, an image forming apparatus includes: an image forming section to form images on sheets based on image data of a document composed of a plurality of document pages; a sheet finishing section to perform sheet finishing to the sheets; a first input section to receive an input regarding divisions of the document pages by the sheet finishing to set the input divisions; a second input section to receive setting of addition of a front cover; and a control section to allow the image forming section to form an image on a first sheet of each of the divisions as the front cover when the first input section sets the divisions of the document pages by the sheet finishing and the second input section sets the addition of the front cover.

According to an aspect of the preferred embodiment of the present invention, an image forming system includes: an operation apparatus to transmit image data of a document composed of a plurality of document pages and an instruction of sheet finishing performed to sheets on which images are formed based on the image data; and an image forming apparatus including an image forming section to form the images on the sheets based on the image data received from the operation apparatus, and a sheet finishing apparatus to perform the sheet finishing to the sheets, the image forming apparatus connected to the operation apparatus in a state capable of mutual communications, wherein: the operation apparatus includes: a first input section to receive an input regarding divisions of the document pages by the sheet finishing; and a second input section to perform a setting of addition of a front cover, and the image forming apparatus includes a control section to allow the image forming section to form the images with a first sheet of each of the divisions used as the front cover when the divisions of the document pages by the sheet finishing are set with the first input section and the setting of the addition of the front cover is performed with the second input section.

According to an aspect of the present invention, if divisions of document pages by the sheet finishing are set and the addition of front covers is set, then it is possible to allow the image forming section to form an image on the first sheet of each division as a front cover. Consequently, a user can spare the trouble of performing front cover setting to each division of the document pages or to each document page to which the sheet finishing is executed, and then the usability to the user can be improved.

Preferably, the image forming apparatus further includes a third input section to receive a choice of whether to form an image of the document pages on the front cover or whether to form a blank image on the front cover, wherein the control sectional allows the image forming section to form the image of the first document page of each of the divisions on the front cover when the image of the first document page of each of the divisions is chosen to be formed on the front cover with the third input section, and the control section allows the image forming section to form the blank image on the front cover when the blank image is chosen to be formed on the front cover.

Furthermore, a user can arbitrarily choose whether to form the image of a document page on a front cover or whether to form the image of a blank image on the front cover. If the image of the first documents page of each division is chosen as the image to be formed on a front cover, then it is possible to allow the image forming section to form the image of the first documents page of each division on the front cover. Moreover, if the image of the blank image is chosen as the image to be formed on a front cover, then it is possible to allow the image forming section to form the blank image on the front cover.

Preferably, the image forming apparatus further comprising a fourth input section to receive setting of whether to add the front cover only to a first division among the plurality of divisions of the document pages or not, wherein the control section allows the image forming section to form the images with respect to the divisions of the document pages based on the setting with the fourth input section.

Furthermore, a user can arbitrarily choose whether to add a front cover only to the first division among a plurality of divisions of document pages or not, and consequently the convenience to the user can be improved.

Preferably, the sheet finishing is stapling processing of binding the sheets of paper on which the images are formed.

Furthermore, it is possible to allow the image forming section to form an image on a first sheet of a bundle of sheets of paper to be subjected to stapling processing as a front cover.

The present U.S. patent application claims a priority under the Paris Convention of Japanese patent application No. 2007-118596 filed on Apr. 27, 2007, which shall be a basis of correction of an incorrect translation.

What is claimed is:

1. An image forming apparatus comprising:

an image forming section to form images on sheets based on image data of a document composed of a plurality of document pages;

a sheet finishing section to perform sheet finishing to the sheets;

a first input section to receive an input regarding divisions of the document pages by the sheet finishing to set the input divisions;

a second input section to receive setting of addition of a front cover; and a control section to allow the image forming section to form an image on a first sheet of each of the divisions as the front cover when the first input section sets the divisions of the document pages by the sheet finishing and the second input section sets the addition of the front cover.

2. The image forming apparatus of claim 1, further comprising a third input section to receive a choice of whether to form an image of the document pages on the front cover or to form a blank image on the front cover, wherein the control section allows the image forming section to form the image of the first document page of each of the divisions on the front cover when the image of the first document page of each of the divisions is chosen to be formed on the front cover with the third input section, and the control section allows the image forming section to form the blank image on the front cover when the blank image is chosen to be formed on the front cover.

3. The image forming apparatus of claim 1, further comprising a fourth input section to receive setting of whether to add the front cover only to a first division among the plurality of divisions of the document pages or not, wherein the control section allows the image forming section to form the images with respect to the divisions of the document pages based on the setting with the fourth input section.

4. The image forming apparatus of claim 1, wherein the sheet finishing is stapling processing of binding the sheets of paper on which the images are formed.

5. An image forming system comprising:

an operation apparatus to transmit image data of a document composed of a plurality of document pages and an instruction of sheet finishing performed to sheets on which images are formed based on the image data; and an image forming apparatus including an image forming section to form the images on the sheets based on the image data received from the operation apparatus, and a sheet finishing apparatus to perform the sheet finishing to the sheets, the image forming apparatus connected to the operation apparatus in a state capable of mutual communications, wherein:

the operation apparatus includes:

a first input section to receive an input regarding divisions of the document pages by the sheet finishing; and a second input section to perform a setting of addition of a front cover, and the image forming apparatus includes a control section to allow the image forming section to form the images with a first sheet of each of the divisions used as the front cover when the divisions of the document pages by the sheet finishing are set with the first input section and the setting of the addition of the front cover is performed with the second input section.

6. The image forming system of claim 5, wherein:

the operation apparatus includes a third input section to receive a choice of whether to form an image of the first document page of each of the divisions on the front cover or to form a blank image on the front cover; and the control section allows the image forming section to form the image of the first document page of each of the divisions on the front cover when the image of the first document page of each of the divisions is chosen to be formed on the front cover with the third input section, and the control section allows the image forming section to form the blank image on the front cover when the blank image is chosen to be formed on the front cover.

7. The image forming system of claim 5, wherein:

the operation apparatus includes a fourth input section to perform a setting of whether to add the front cover only to a first division among the plurality of divisions of the document pages or not; and the control section allows the image forming section to form an images with respect to the divisions of the document pages based on the setting with the fourth input section.

8. The image forming system of claim 5, wherein the sheet finishing is stapling processing of binding the sheets of paper on which the images are formed.

* * * * *